(12) United States Patent
Fetzer et al.

(10) Patent No.: US 11,402,353 B2
(45) Date of Patent: Aug. 2, 2022

(54) IMAGING BEAM ADJUSTMENTS ON A NON-DESTRUCTIVE INSPECTION SENSOR SITUATED ON A ROBOTIC EFFECTOR TO ACCOMMODATE IN SITU CONDITIONS

(71) Applicant: The Boeing Company, Chicago, IL (US)

(72) Inventors: Barry A. Fetzer, Renton, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 372 days.

(21) Appl. No.: 16/252,842

(22) Filed: Jan. 21, 2019

(65) Prior Publication Data

US 2020/0232951 A1 Jul. 23, 2020

(51) Int. Cl.
*G01N 29/22* (2006.01)
*B25J 5/00* (2006.01)
(Continued)

(52) U.S. Cl.
CPC .............. *G01N 29/225* (2013.01); *B25J 5/00* (2013.01); *B25J 9/023* (2013.01); *B25J 9/1684* (2013.01);
(Continued)

(58) Field of Classification Search
CPC . G01N 29/225; G01N 2291/2638; B25J 5/00; B25J 9/023; B25J 9/1684; B25J 15/0019; G05D 1/0094; G05D 2201/0207
(Continued)

(56) References Cited

U.S. PATENT DOCUMENTS

| 4,881,177 | A | 11/1989 | McClean et al. |
| 7,779,694 | B2 * | 8/2010 | Iizuka ..................... G01N 29/07 73/622 |

(Continued)

FOREIGN PATENT DOCUMENTS

DE 102006003556 A1 * 8/2007 ............. B23K 9/126

OTHER PUBLICATIONS

Translation DE-102006003556-A1 (Year: 2007).*
European Search Report dated May 13, 2020, EP Application No. 19212705.

*Primary Examiner* — Alexander A Mercado
*Assistant Examiner* — Monica S Young
(74) *Attorney, Agent, or Firm* — Perman & Green, LLP

(57) ABSTRACT

A non-destructive inspection apparatus includes a robotic device, an end effector coupled to the robotic device, and a controller coupled to the robotic device and the end effector. The controller is configured to determine, based on an amount of linear actuator extension of a sensor of the end effector and an amount of rotation of the sensor about a first axis of rotation and a second axis of rotation, a displacement of the sensor relative to a center point of the end effector surface so as to determine location information of the sensor, wherein sensor data for a location on a surface of a test article is sensed and correlated with the determined location information of the sensor. The robotic device controls movement of the end effector and is configured to determine, during the movement of the end effector, positional information for the center point of the end effector surface.

20 Claims, 16 Drawing Sheets

(51) Int. Cl.
*B25J 9/02* (2006.01)
*B25J 9/16* (2006.01)
*B25J 15/00* (2006.01)
*G05D 1/00* (2006.01)

(52) U.S. Cl.
CPC ........ *B25J 15/0019* (2013.01); *G05D 1/0094* (2013.01); *G01N 2291/2638* (2013.01); *G05D 2201/0207* (2013.01)

(58) Field of Classification Search
USPC .......................................................... 73/618
See application file for complete search history.

(56) References Cited

U.S. PATENT DOCUMENTS

| | | | |
|---|---|---|---|
| 8,892,252 B1* | 11/2014 | Troy | G01B 11/14 700/245 |
| 10,105,837 B2 | 10/2018 | Troy et al. | |
| 10,987,809 B2* | 4/2021 | Brown | B25J 15/0019 |
| 2009/0010285 A1* | 1/2009 | Dubois | G10K 15/046 372/3 |
| 2010/0143089 A1* | 6/2010 | Hvass | B05B 13/005 414/754 |
| 2012/0235036 A1* | 9/2012 | Hatakeyama | H01J 37/20 250/310 |
| 2013/0145850 A1* | 6/2013 | Lute, Jr. | G01N 29/265 73/619 |
| 2013/0340531 A1* | 12/2013 | Hutchinson | G01N 29/043 73/633 |
| 2014/0267626 A1* | 9/2014 | Lilagan | H04N 5/232125 348/46 |
| 2015/0266183 A1 | 9/2015 | Alifragkis et al. | |
| 2016/0081668 A1 | 3/2016 | Chirikjian et al. | |
| 2016/0235586 A1* | 8/2016 | Fu | A61F 9/0084 |
| 2016/0278724 A1 | 9/2016 | Papaioannou | |
| 2016/0318632 A1* | 11/2016 | Froom | B64F 5/00 |
| 2016/0368134 A1* | 12/2016 | Hafenrichter | G01N 27/90 |
| 2017/0072567 A1* | 3/2017 | Carter | B25J 9/1692 |
| 2017/0225804 A1* | 8/2017 | Hafenrichter | B64F 5/60 |
| 2020/0134773 A1* | 4/2020 | Pinter | G06T 7/521 |
| 2020/0232951 A1* | 7/2020 | Fetzer | B25J 9/023 |

* cited by examiner

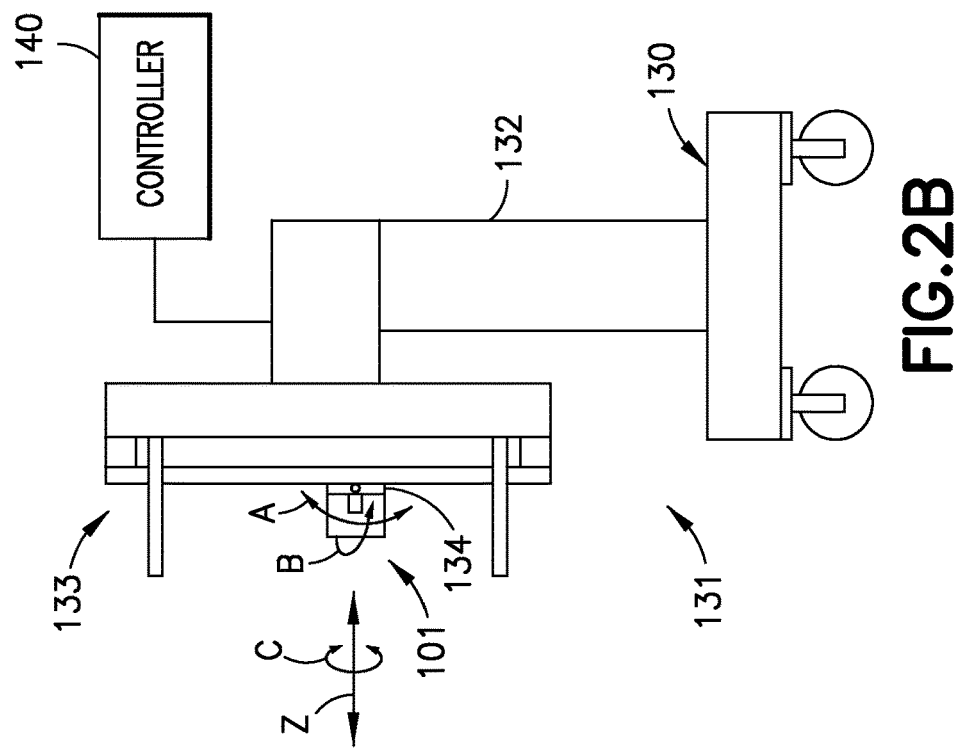
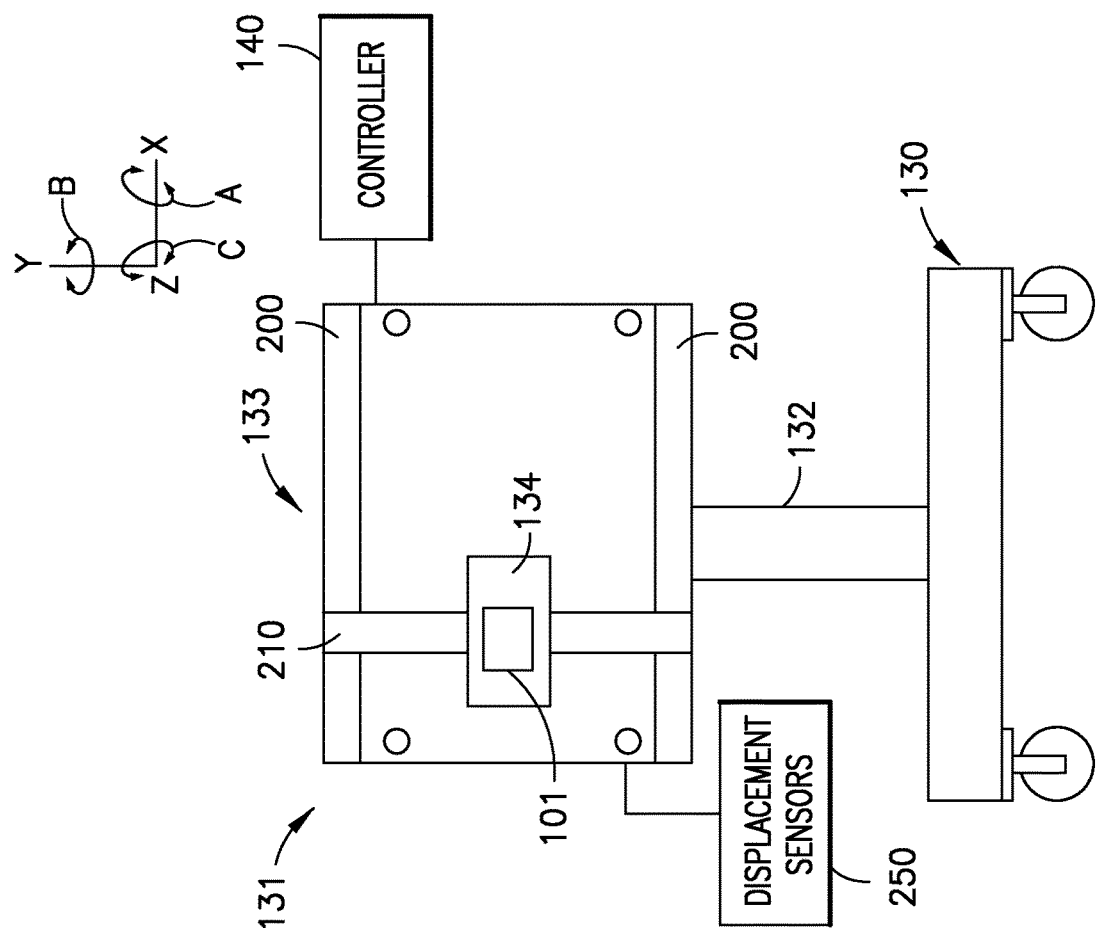

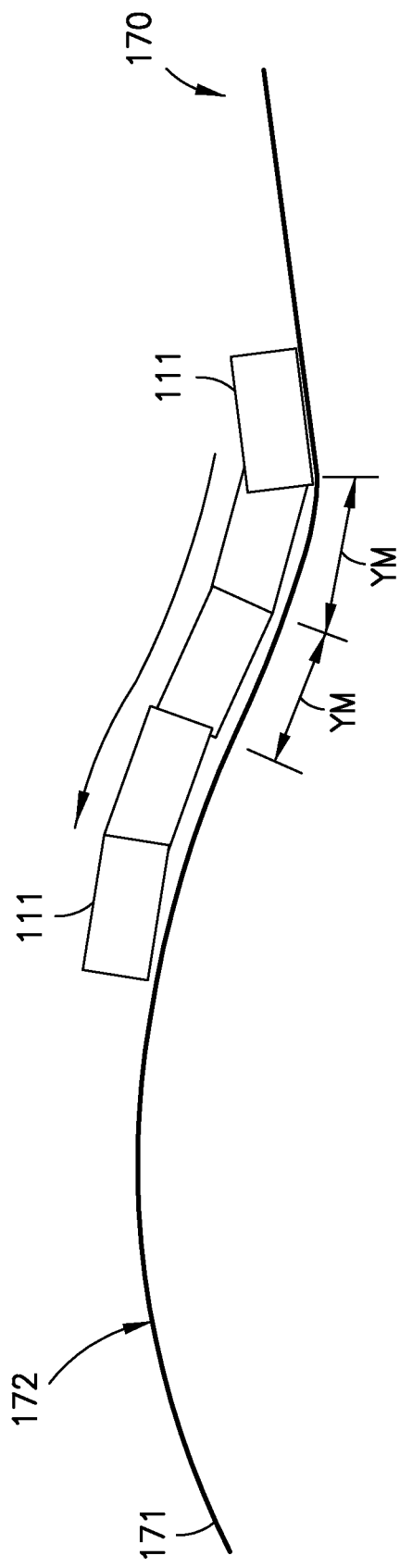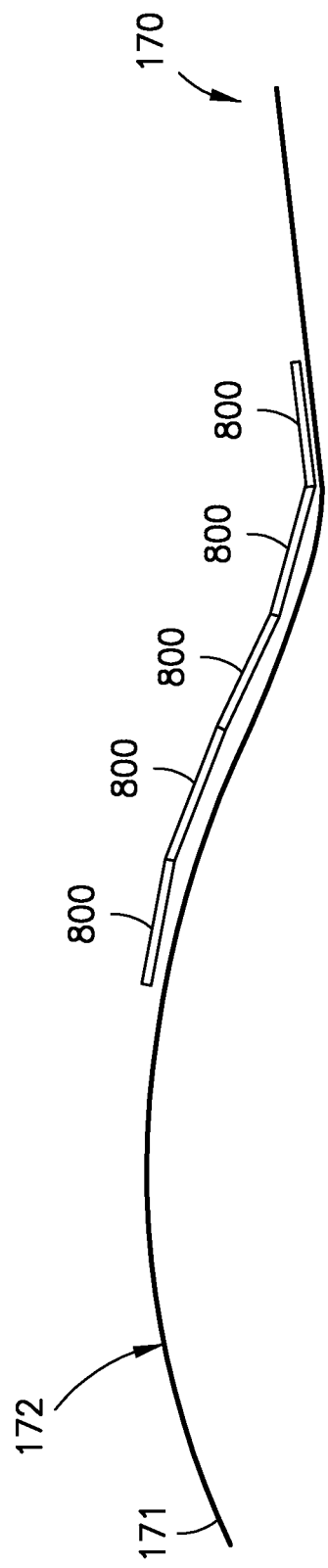

IMAGING BEAM ADJUSTMENTS ON A NON-DESTRUCTIVE INSPECTION SENSOR SITUATED ON A ROBOTIC EFFECTOR TO ACCOMMODATE IN SITU CONDITIONS

BACKGROUND

1. Field

The exemplary embodiments generally relate to inspection apparatus and more particularly to non-destructive inspection apparatus.

2. Brief Description of Related Developments

Generally, non-destructive testing of components, such as aircraft components, employs inspection apparatus that captures metrological data for the components in a two dimensional coordinate system relative to a surface of the component. The two dimensional data metrological data is then over-laid onto a three dimensional computer aided drafting (CAD) model of the component. For example, one method to correlate the two dimensional metrological data to the three dimensional coordinate system of the component is to manually type the three dimensional component coordinate information into Microsoft PowerPoint™ overlay of the two dimensional metrological data. Another method to correlate the two dimensional metrological data to the three dimensional coordinate system of the component is to overlay two dimensional C-scans (i.e., a two dimensional presentation of data displayed as a top or planar view of a test piece) onto a three dimensional CAD surface of the component for trend analysis and data archival. These methods of correlating the two dimensional metrological data to the three dimensional coordinate system of the component may create gaps in the overlays and is very operator dependent. Over-laying the two dimensional metrological data onto the three dimensional computer aided drafting (CAD) model of the component is costly, labor intensive, and requires multiple software packages.

Another non-destructive inspection method includes generating, separate from capturing the metrological data, a surface point cloud using a laser-based three dimensional scanner and then matching and joining the surface point cloud data with the two dimensional metrological data. This method requires additional instrumentation, an additional scanning step, additional capital costs, and stretching and alignment of the metrological data onto the surface point cloud. In this method there may not be a one-to-one correlation of each A-scan waveform (i.e., a waveform display in which echo amplitude and transit time are plotted on a simple two dimensional grid with one axis representing amplitude and the other axis representing time).

SUMMARY

Accordingly, apparatuses and methods intended to address, at least, the above-identified concerns would find utility.

The following is a non-exhaustive list of examples, which may or may not be claimed, of the subject matter according to the present disclosure.

One example of the subject matter according to the present disclosure relates to a non-destructive inspection apparatus comprising: an end effector comprising a linear actuator configured to extend normal to an end effector surface, a first gimbal disposed on an end of the linear actuator so as to be extended by the linear actuator, the first gimbal comprising a rotational coupling that defines a first axis of rotation that is substantially parallel with the end effector surface, a second gimbal pivotally connected to the rotational coupling of the first gimbal, the second gimbal defines a second axis of rotation that is substantially perpendicular to the first axis of rotation, and a sensor coupled to the second gimbal so that the sensor rotates with the second gimbal about the second axis of rotation and rotates relative to the first gimbal about the first axis of rotation; a robotic device, the end effector being coupled to the robotic device so that the robotic device controls movement of the end effector, the robotic device being configured to determine, during the movement of the end effector, positional information for a center point of the end effector surface; and a controller coupled to the robotic device and the end effector, the controller being configured to determine, based on an amount of linear actuator extension and an amount of rotation of the sensor about the first axis of rotation and the second axis of rotation, a displacement of the sensor relative to the center point of the end effector surface so as to determine location information of the sensor, wherein sensor data for a location on a surface of a test article is sensed and correlated with the determined location information of the sensor.

Another example of the subject matter according to the present disclosure relates to a non-destructive inspection apparatus comprising: an end effector comprising a linear actuator configured to extend normal to an end effector surface, a first gimbal disposed on an end of the linear actuator so as to be extended by the linear actuator, the first gimbal comprising a rotational coupling that defines a first axis of rotation that is substantially parallel with the end effector surface, a second gimbal pivotally connected to the rotational coupling of the first gimbal, the second gimbal defines a second axis of rotation that is substantially perpendicular to the first axis of rotation, and a sensor coupled to the second gimbal so that the sensor rotates with the second gimbal about the second axis of rotation and rotates relative to the first gimbal about the first axis of rotation; a mobile device, the end effector being coupled to the mobile device so that the mobile device controls movement of the end effector, the mobile device being configured to determine, during the movement of the end effector, positional information for a center point of the end effector surface; and a controller coupled to the mobile device and the end effector, the controller being configured to determine, based on an amount of linear actuator extension and an amount of rotation of the sensor about the first axis of rotation and the second axis of rotation, a displacement of the sensor relative to the center point of the end effector surface so as to determine location information of the sensor, wherein sensor data for a location on a surface of a test article is sensed and correlated with the determined location information of the sensor.

Still another example of the subject matter according to the present disclosure relates to a method for inspecting a test article with a non-destructive inspection apparatus, the method comprising: positioning, with a robotic device, an end effector relative to the test article where the end effector is coupled to the robotic device so that the robotic device controls movement of the end effector and the end effector comprises a linear actuator configured to extend normal to an end effector surface, a first gimbal disposed on an end of the linear actuator so as to be extended by the linear actuator, the first gimbal comprising a rotational coupling that defines a first axis of rotation that is substantially parallel with the end effector surface, a second gimbal pivotally connected to the rotational coupling of the first gimbal, the second gimbal defines a second axis of rotation that is substantially perpendicular to the first axis of rotation, and a sensor coupled to the second gimbal so that the sensor rotates with the second gimbal about the second axis of rotation and rotates relative to the first gimbal about the first axis of rotation; determining, with the robotic device during the movement of the end effector, positional information for a center point of the end effector surface; and determining, with a controller coupled to the robotic device and the end effector, based on an amount of linear actuator extension and an amount of rotation of the sensor about the first axis of rotation and the second axis of rotation as a result of physical end effector interaction with the test article, a displacement of the sensor relative to the center point of the end effector surface so as to determine location information of the sensor, wherein sensor data for a location on a surface of a test article is sensed and correlated with the determined location information of the sensor.

BRIEF DESCRIPTION OF THE DRAWINGS

Figure 1A:
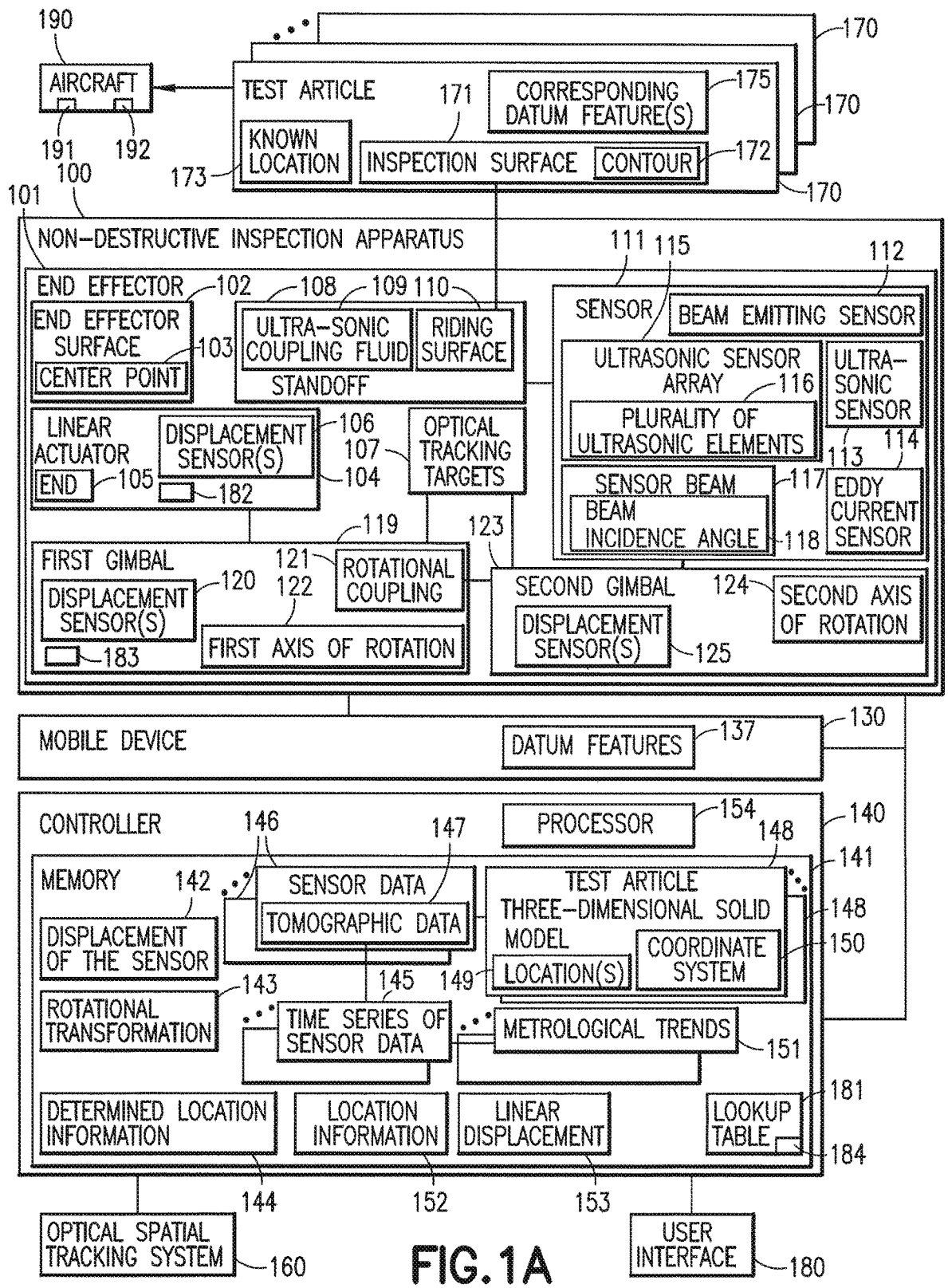
Figure 1B:
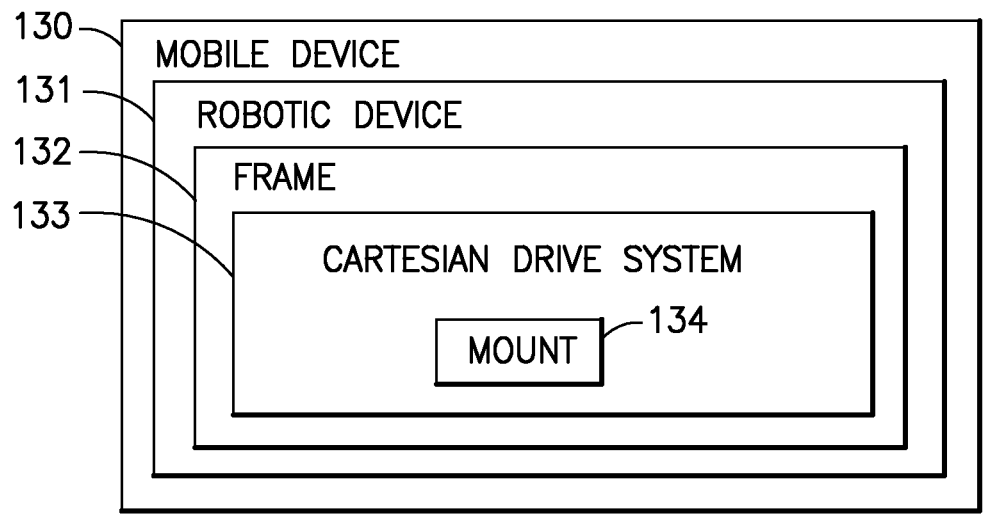
Figure 1C:
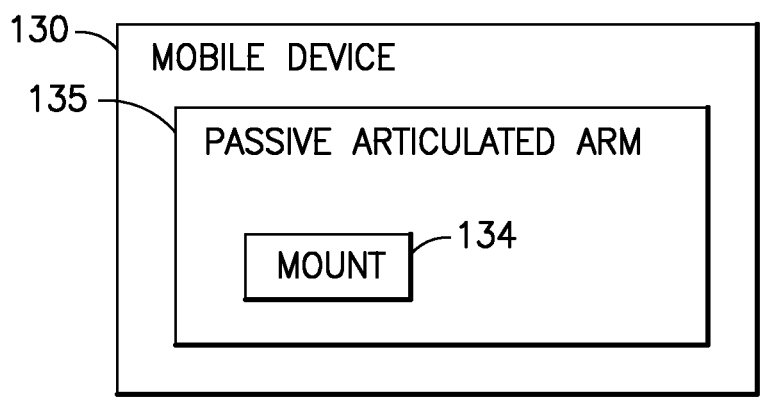
Figure 1D:
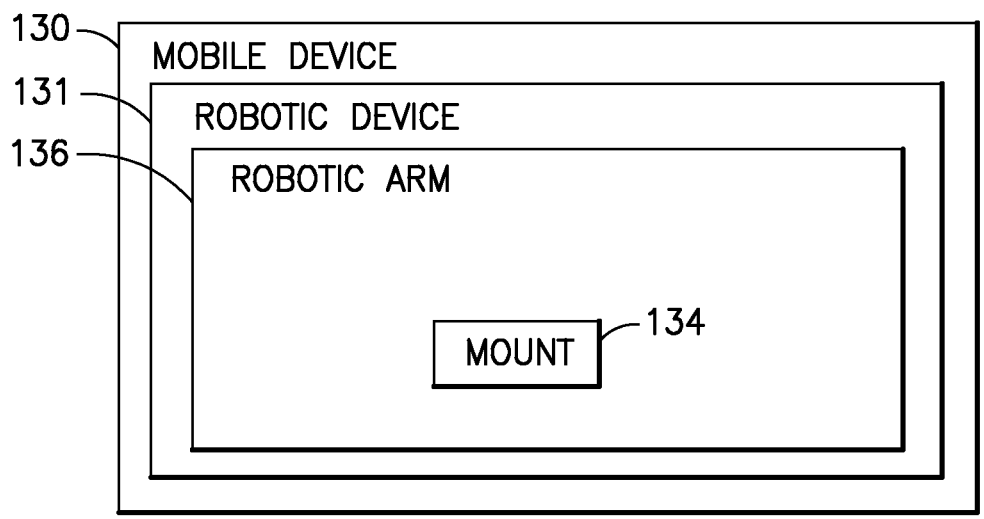
Figure 3A:
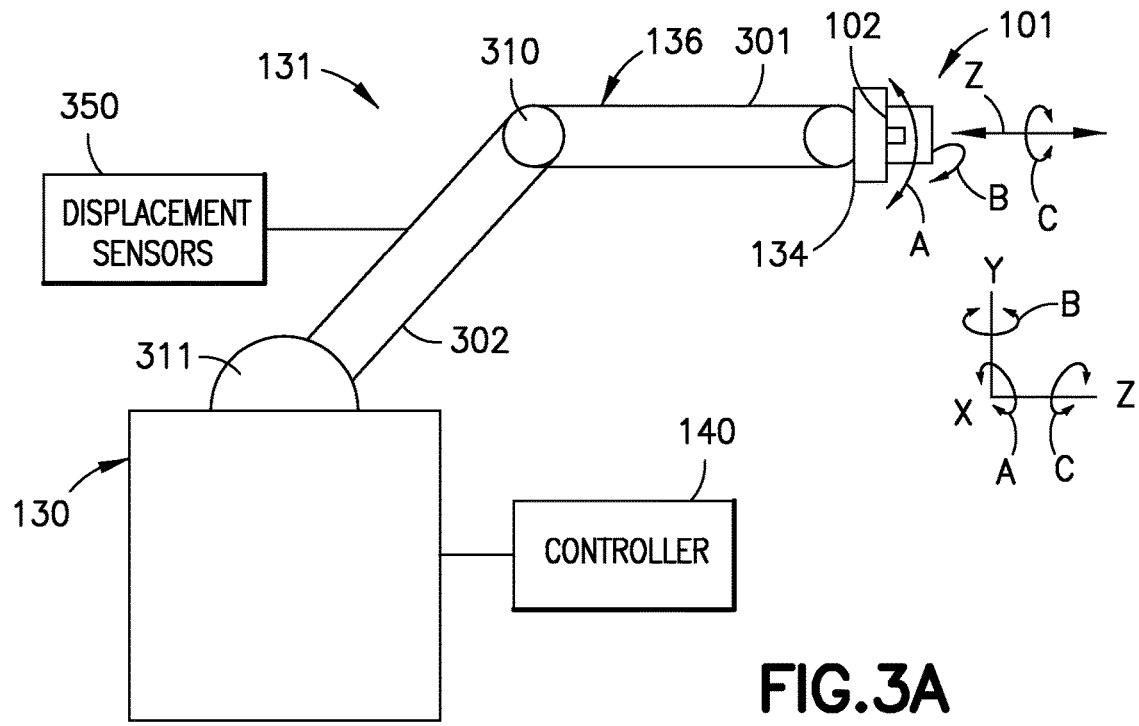
Figure 3B:
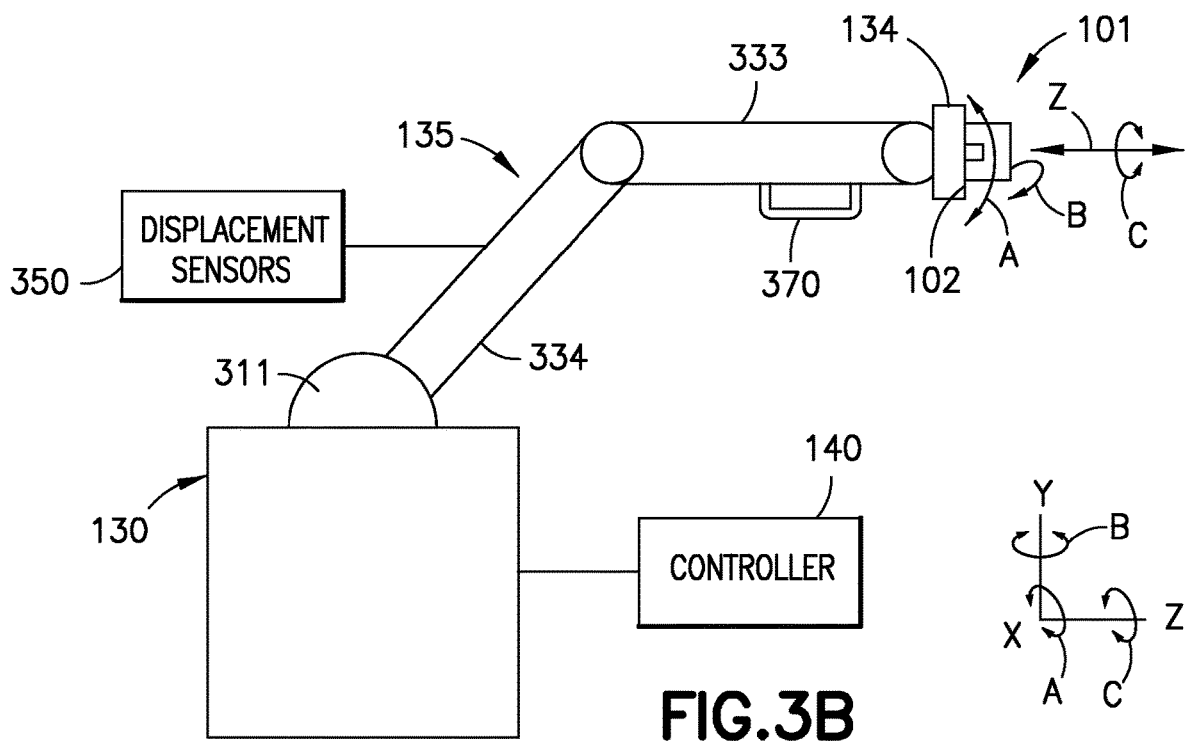
Figure 4:
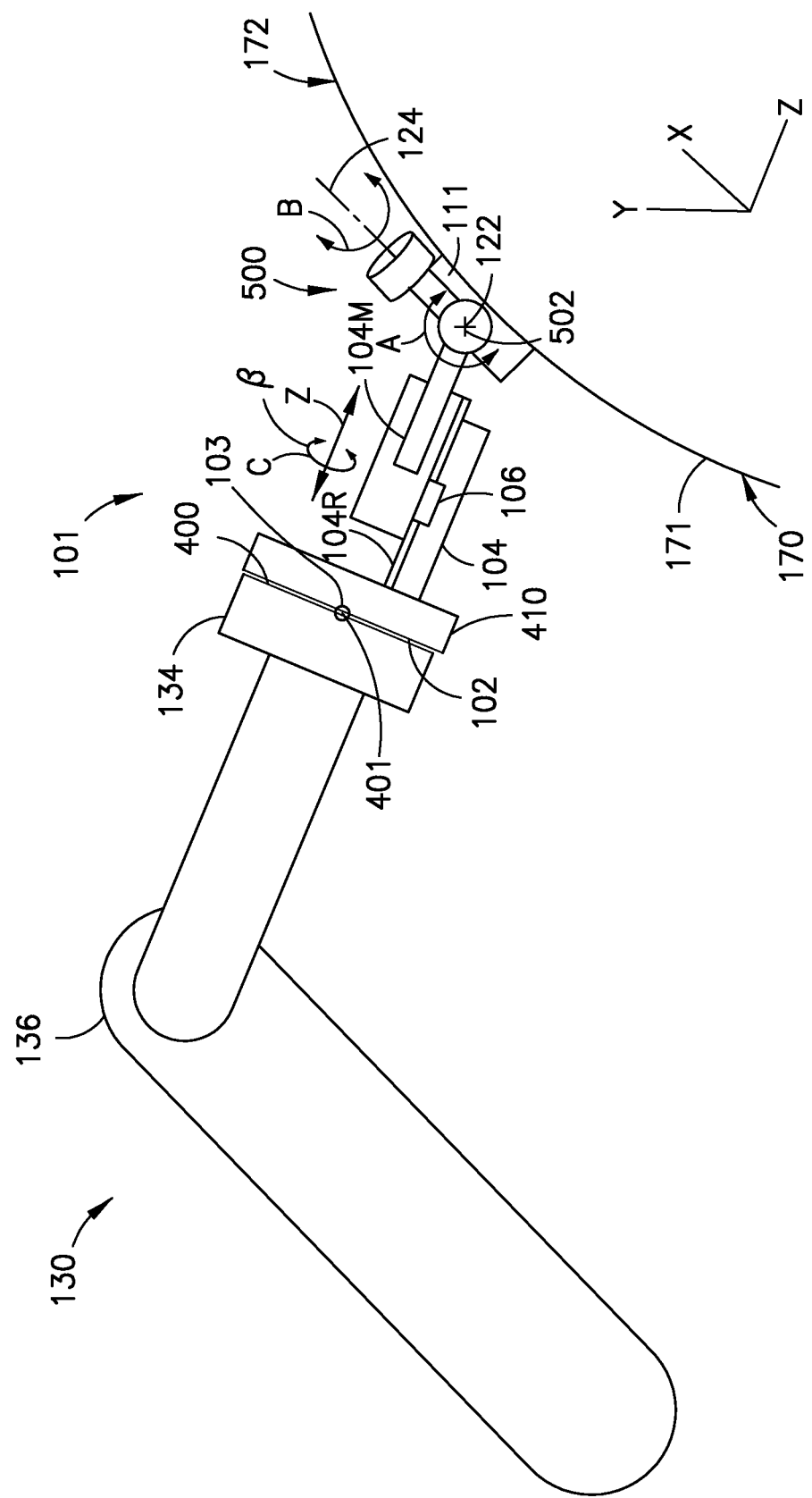
Figure 5A:
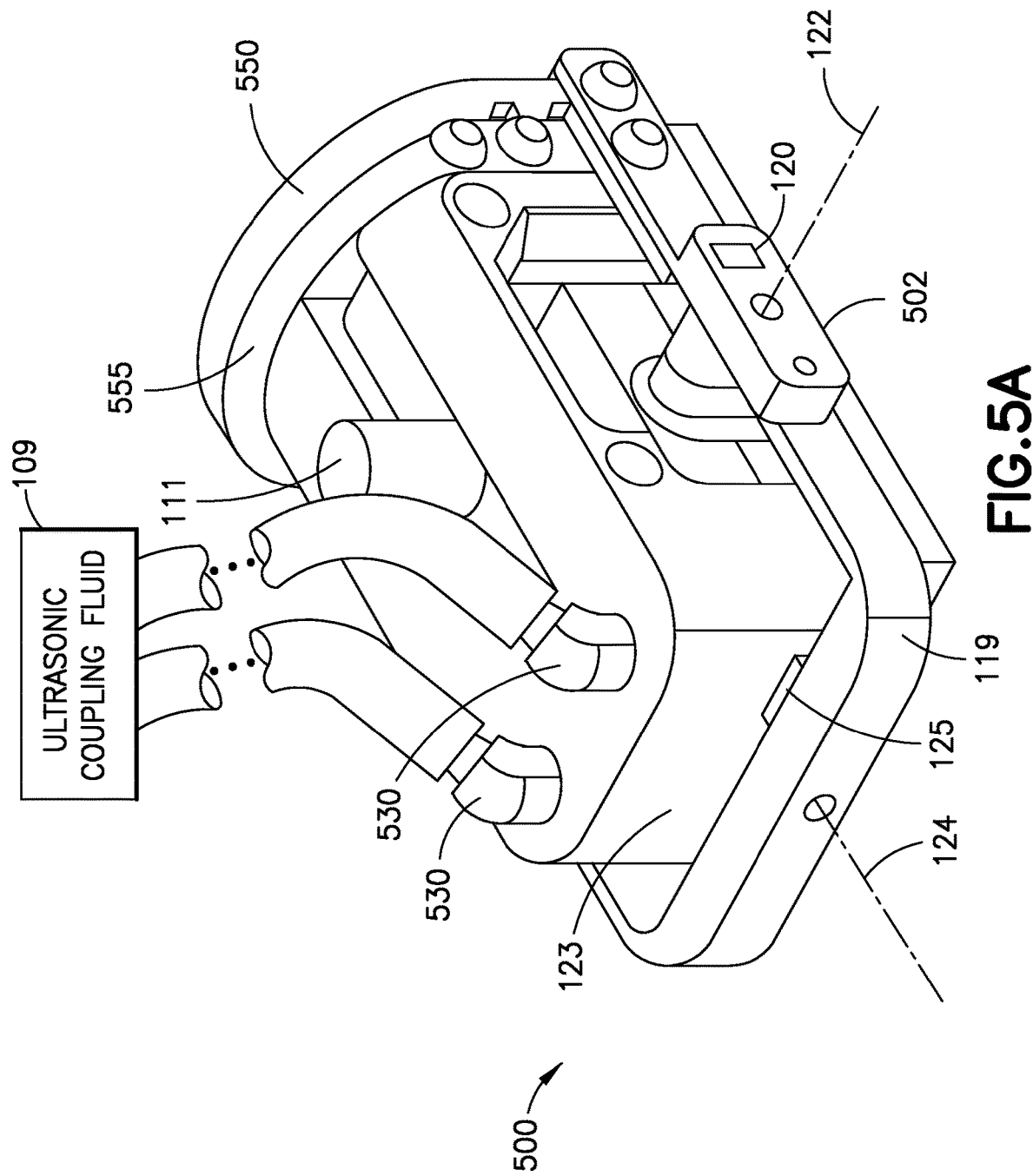
Figure 5B:
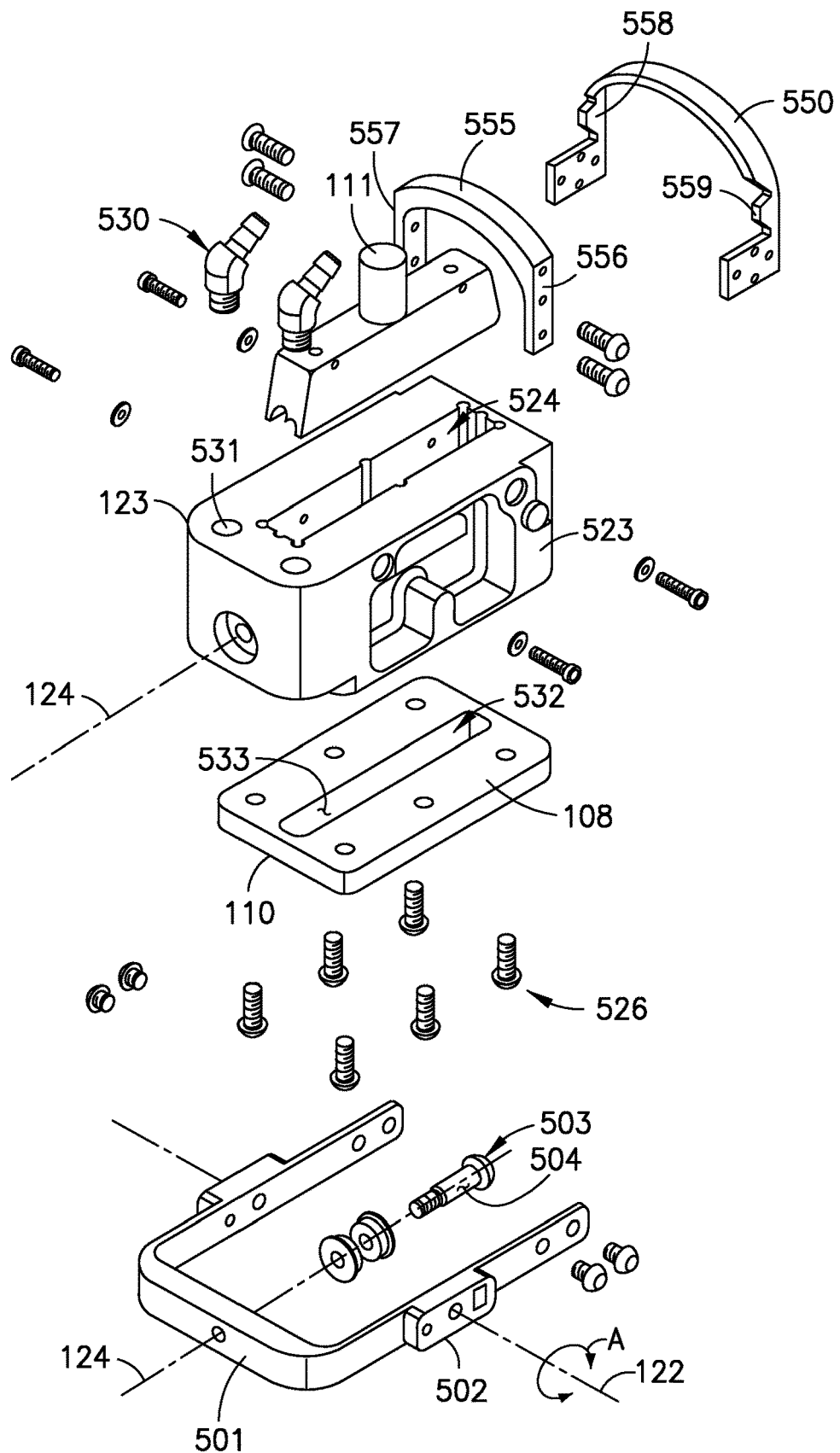
Figure 6:
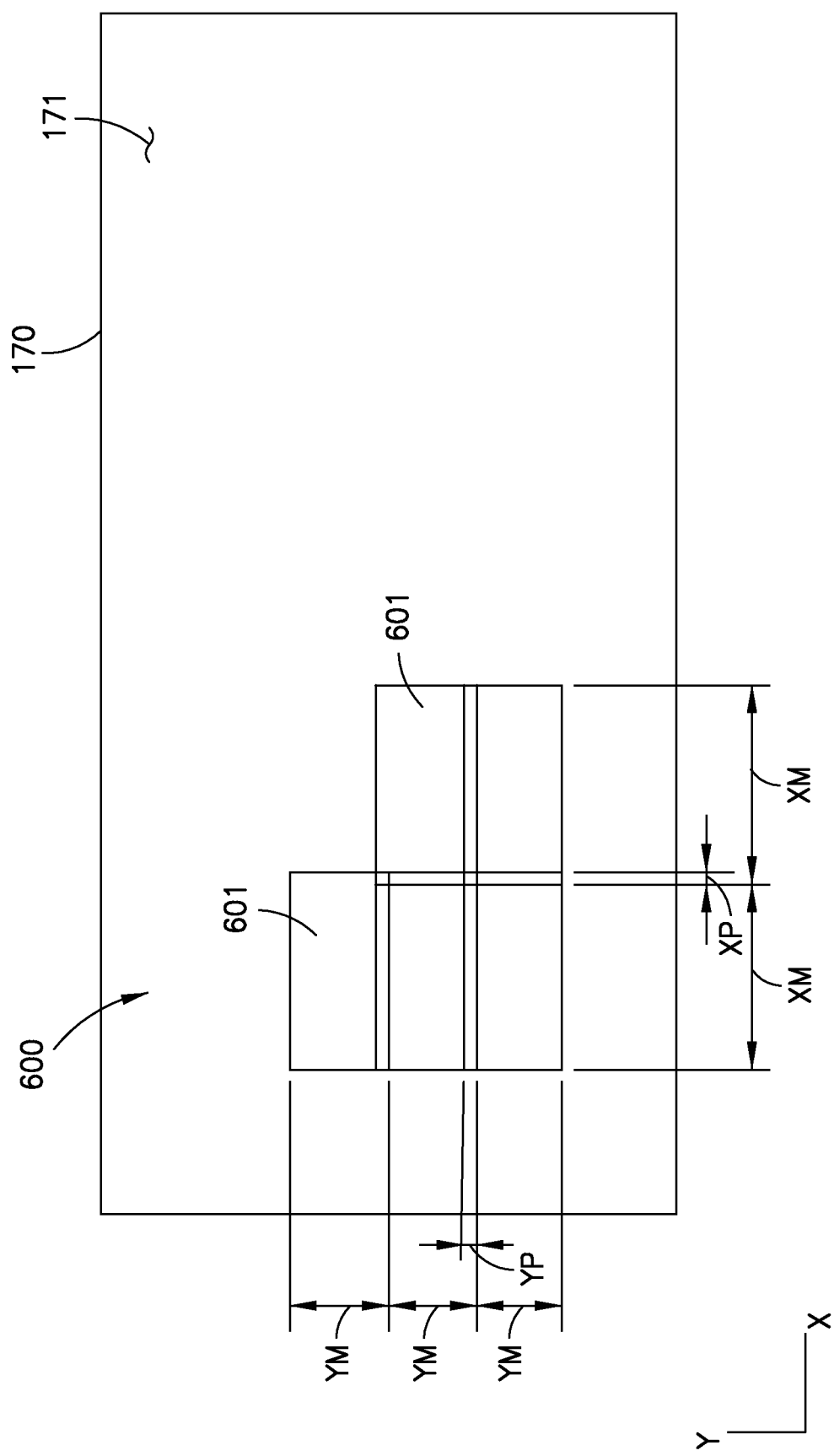
Figure 9:
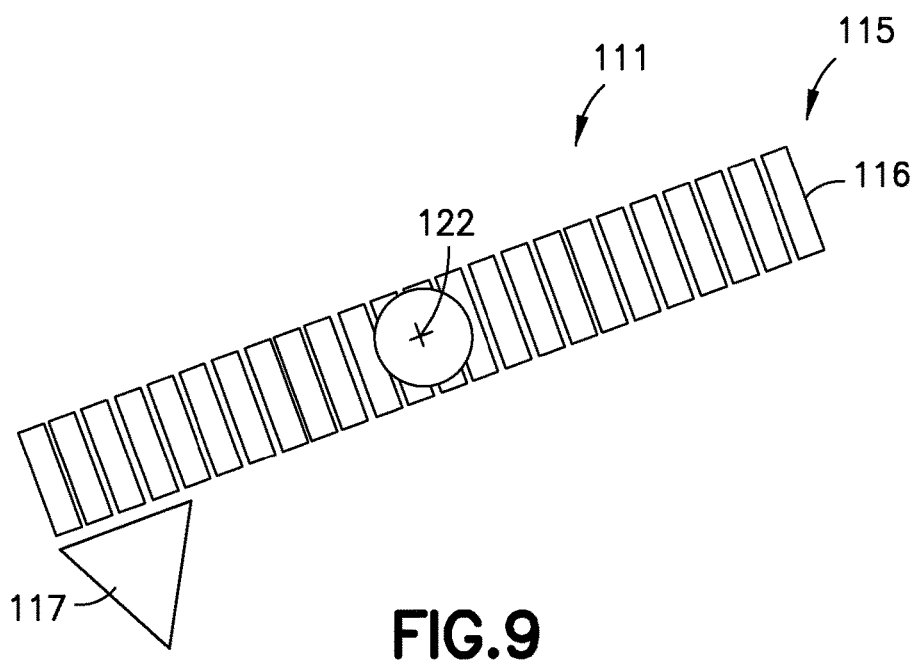
Figure 10A:
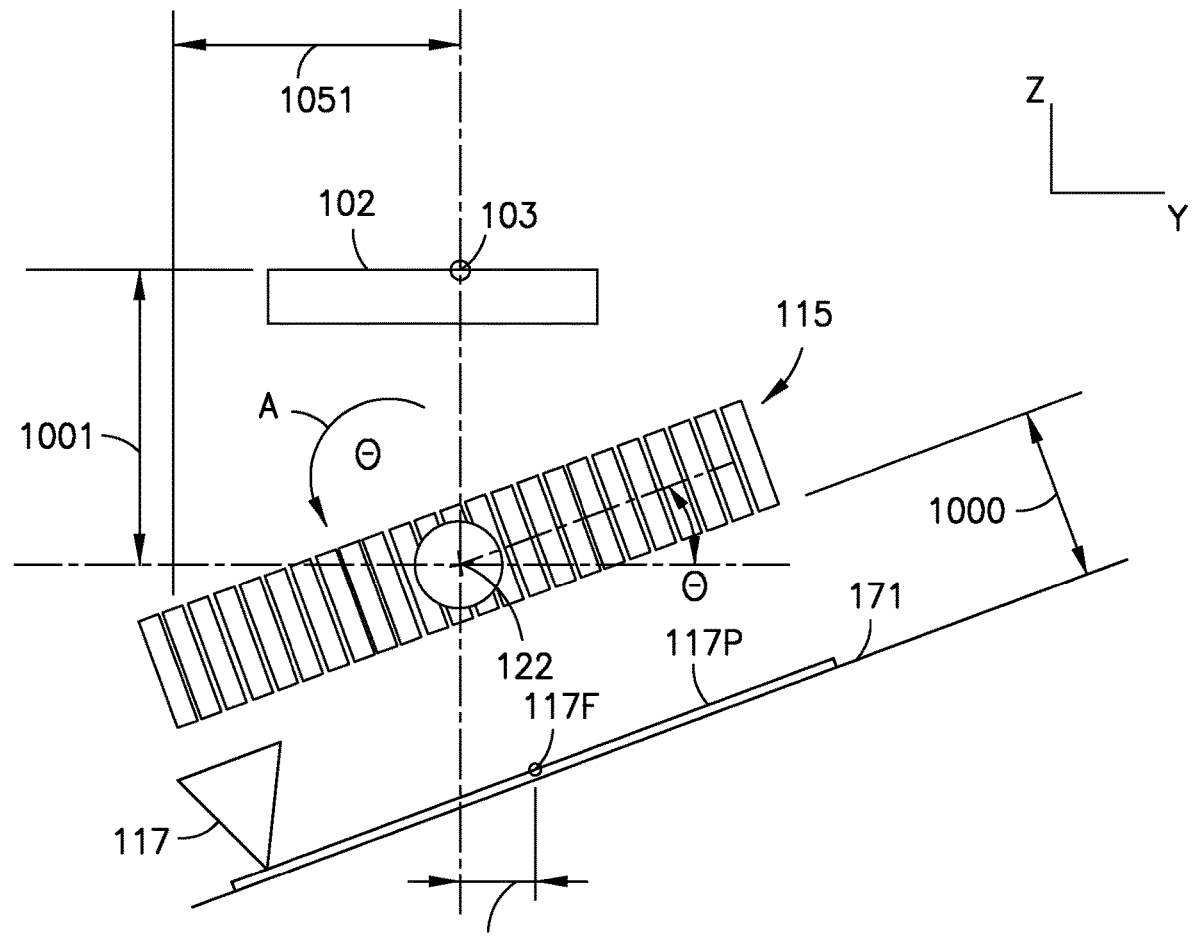
Figure 11:
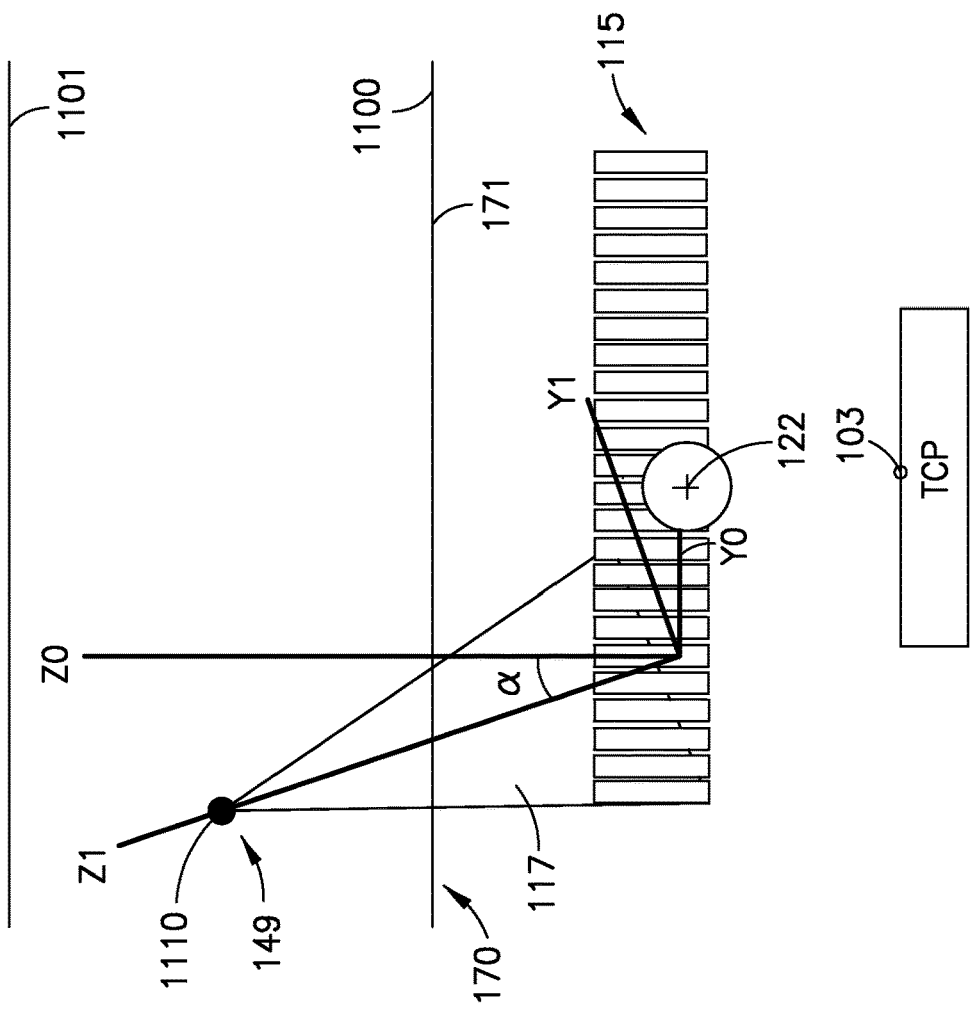
Figure 10B:
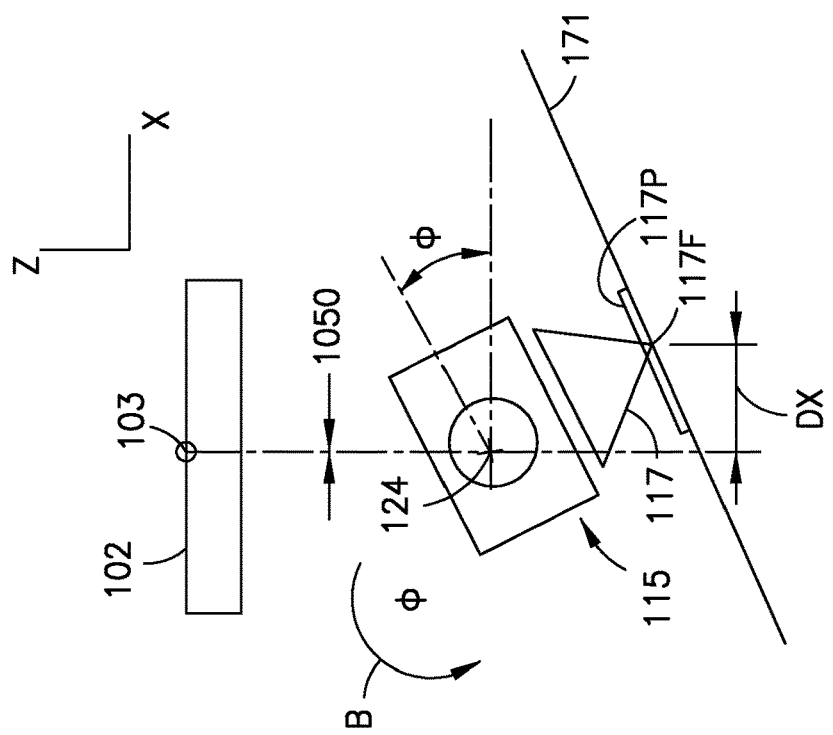
Figure 12:
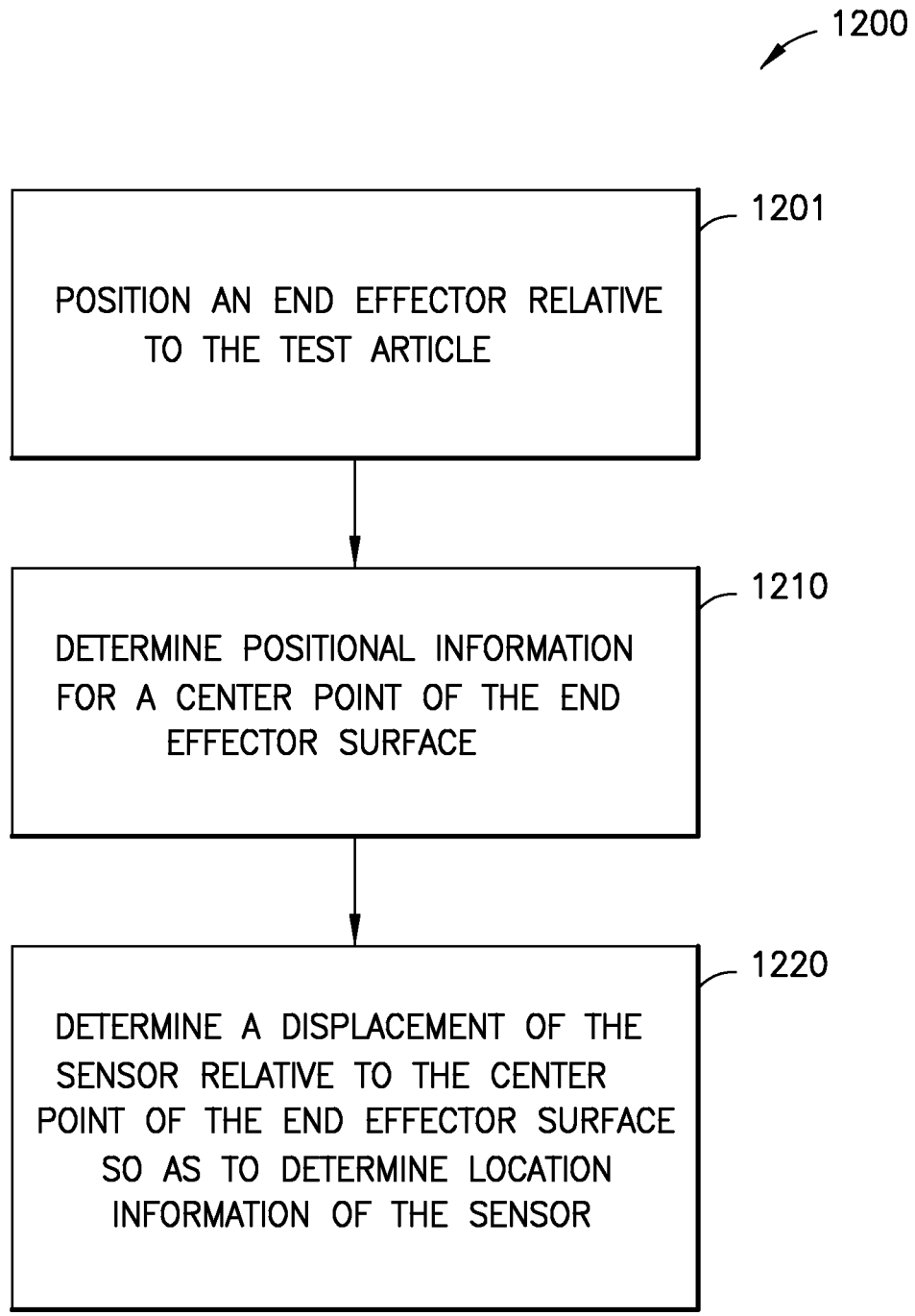
Figure 13:
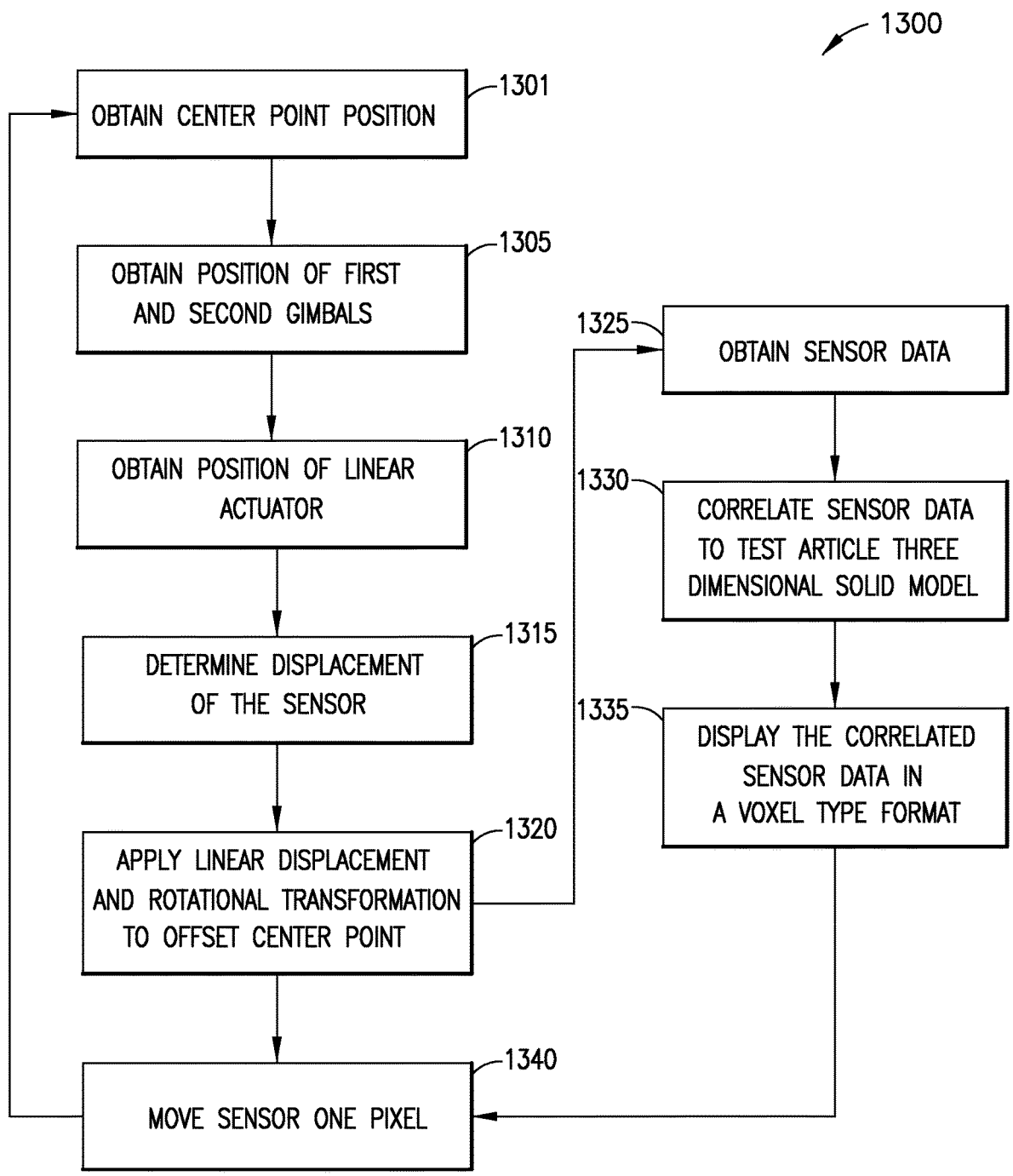
Figure 14:
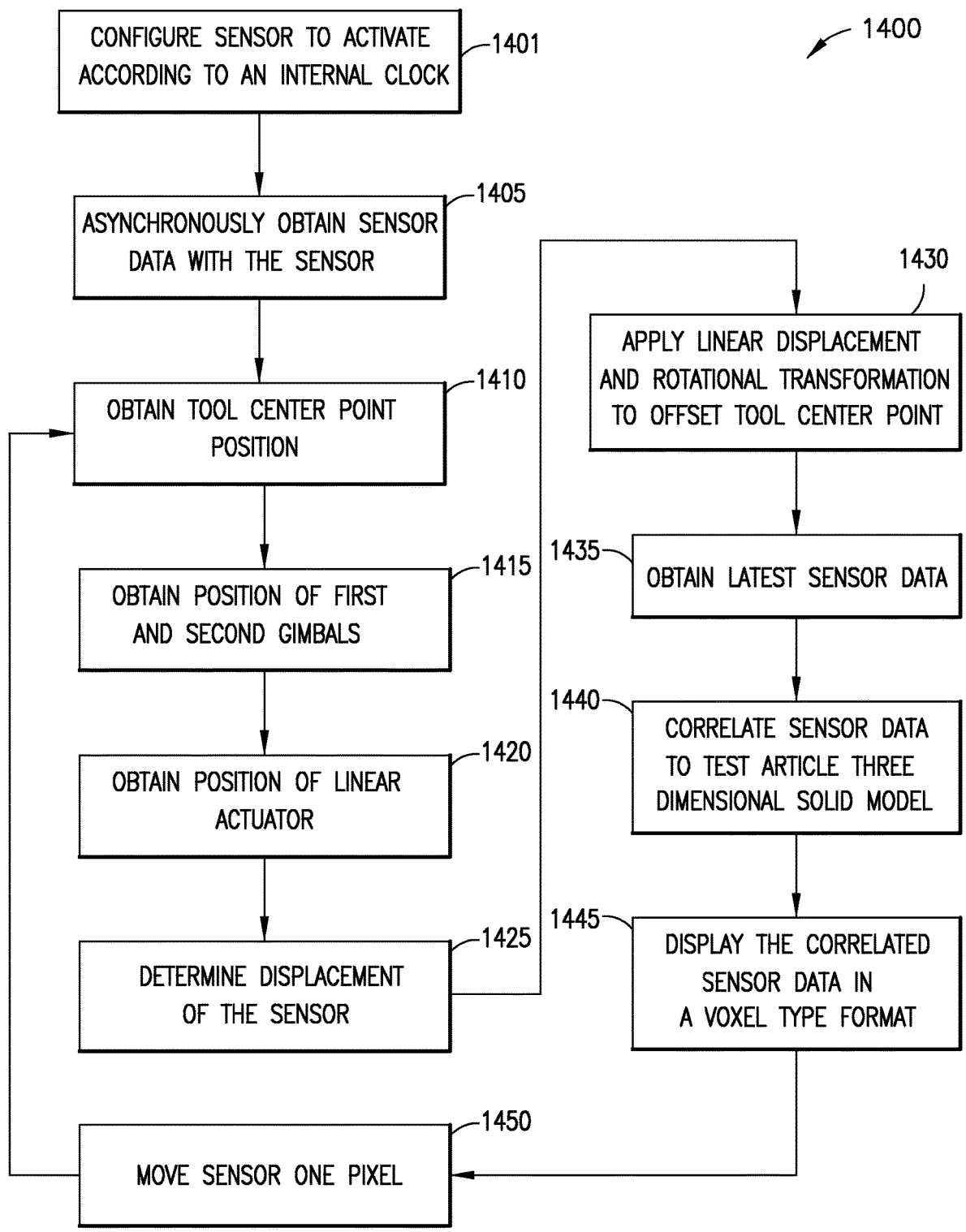
Figure 15:
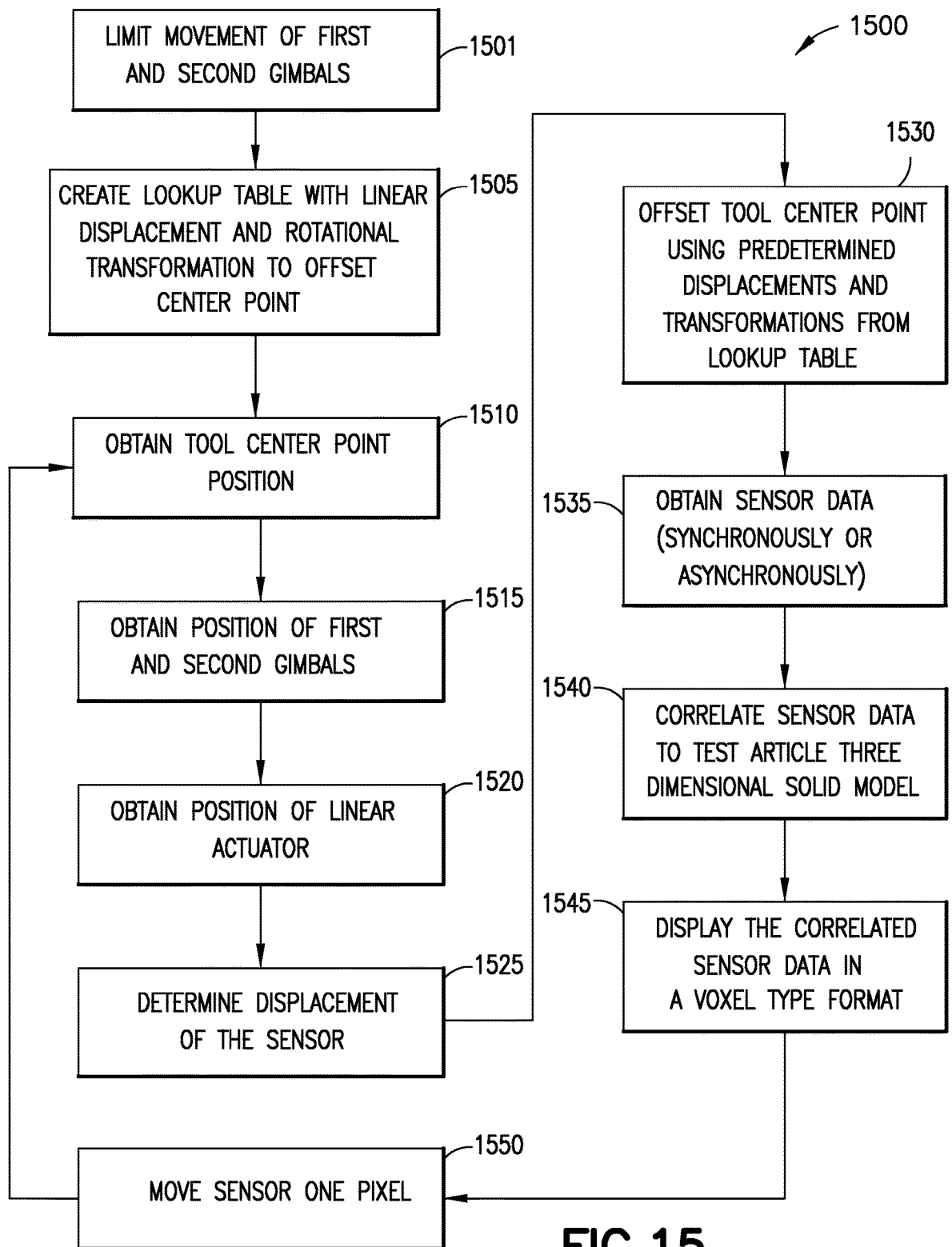
Figure 16:
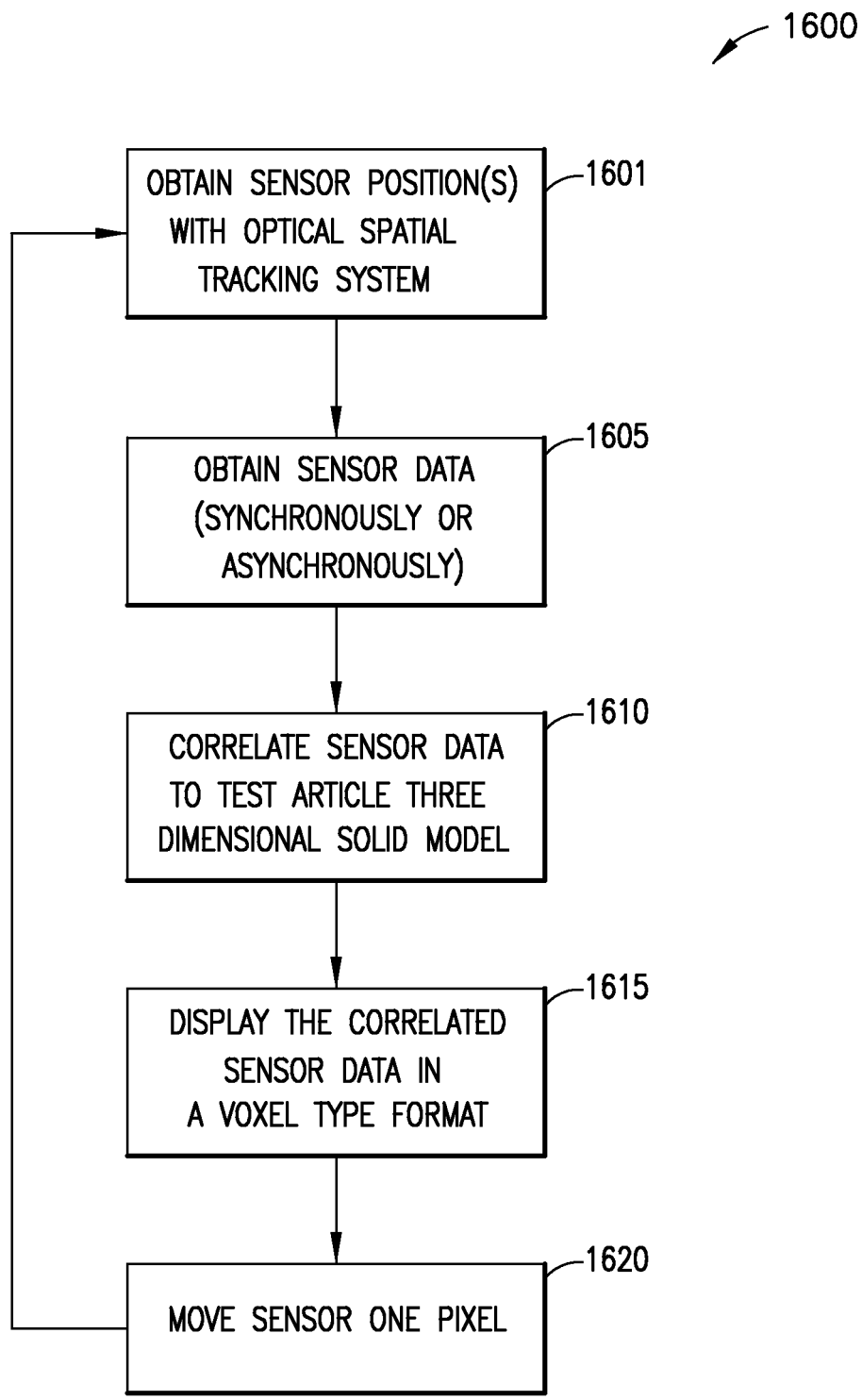

Having thus described examples of the present disclosure in general terms, reference will now be made to the accompanying drawings, which are not necessarily drawn to scale, and wherein like reference characters designate the same or similar parts throughout the several views, and wherein:

FIG. 1A is a schematic block diagram of a non-destructive inspection apparatus in accordance with aspects of the present disclosure;

FIG. 1B is a schematic block diagram of a mobile device of the non-destructive inspection apparatus in accordance with aspects of the present disclosure;

FIG. 1C is a schematic block diagram of a mobile device of the non-destructive inspection apparatus in accordance with aspects of the present disclosure;

FIG. 1D is a schematic block diagram of a mobile device of the non-destructive inspection apparatus in accordance with aspects of the present disclosure;

FIGS. 2A and 2B are respectively front and side view illustrations of the non-destructive inspection apparatus of FIG. 1A in accordance with aspects of the present disclosure;

FIG. 3A is a side view illustration of the non-destructive inspection apparatus of FIG. 1A in accordance with aspects of the present disclosure;

FIG. 3B is a side view illustration of the non-destructive inspection apparatus of FIG. 1A in accordance with aspects of the present disclosure;

FIG. 4 is a schematic illustration of the end effector and a portion of the mobile device of the non-destructive inspection apparatus of FIG. 1A in accordance with aspects of the present disclosure;

FIG. 5A is a perspective view illustration of a portion of the end effector of the non-destructive inspection apparatus of FIG. 1A in accordance with aspects of the present disclosure;

FIG. 5B is a schematic exploded view illustration of a portion of the end effector of the non-destructive inspection apparatus of FIG. 1A in accordance with aspects of the present disclosure;

FIG. 6 is a schematic illustration of a scan pattern in accordance with aspects of the present disclosure;

FIG. 7 is a schematic cross-section illustration of a portion of the end effector in several positions relative to a test article surface in accordance with aspects of the present disclosure;

FIG. 8 is a schematic cross-section illustration of two dimensional C-scan data corresponding to the end effector positions of FIG. 7 presented in a three dimensional voxel type display in accordance with aspects of the present disclosure;

FIG. 9 is a schematic illustration of a portion of the end effector of the non-destructive inspection apparatus of FIG. 1A in accordance with aspects of the present disclosure;

FIG. 10A is a schematic front view illustration of a portion of the end effector relative to a surface of a test article in accordance with aspects of the present disclosure;

FIG. 10B is a schematic side view illustration of a portion of the end effector relative to a surface of a test article in accordance with aspects of the present disclosure;

FIG. 11 is a schematic illustration of a beam incidence angle of the end effector into a test article in accordance with aspects of the present disclosure;

FIG. 12 is a flow diagram of an exemplary method in accordance with aspects of the present disclosure;

FIG. 13 is a flow diagram of an exemplary method in accordance with aspects of the present disclosure;

FIG. 14 is a flow diagram of an exemplary method in accordance with aspects of the present disclosure;

FIG. 15 is a flow diagram of an exemplary method in accordance with aspects of the present disclosure; and FIG. 16 is a flow diagram of an exemplary method in accordance with aspects of the present disclosure.

DETAILED DESCRIPTION

Referring to FIG. 1, the aspects of the present disclosure provide for a non-destructive inspection apparatus 100 that obtains or otherwise collects sensor data 146 for a test article 170. In one aspect, the sensor data 146 may be two dimensional sensor data while in other aspects the sensor data may be tomographic data 147. The sensor data 146 may include any suitable metrological information about the test article 170 including, but not limited to, surface irregularities, deformation, and cracking. The sensor data 146 is obtained with an end effector 101 that includes a sensor 111, where the end effector 101 is coupled to a mobile device 130 at a center point 103 of an end effector surface 102. The mobile device 130 moves the end effector relative to the test article 170 in a pixelated motion (e.g., incremental movements) so that at least an inspection surface 171 of the test article 170 is scanned by the sensor 111. The mobile device 130 may effect movement of the end effector 101 with N degree of freedom movement (some or all of which may be motorized as described herein) so that the mobile device 130 produces, for example, "N" dimension position information that is correlated to the center point 103. Here "N" may be any integer such as six so that the mobile device has six degrees of freedom and produces six dimension position information (e.g., position information for each of the X, Y, Z, A, B, C axes—see FIGS. 2A and 3). In other aspects, "N" may be more or less than six. The "N" dimension position information is attached to the sensor data 146 providing, for the test article 170, three dimensional metrological data mapping, evaluation, and data archival.

In accordance with the aspects of the present disclosure, the non-destructive inspection apparatus 100 correlates the "N" dimensional position information from the mobile device 130 is to the sensor data 146 (e.g., such as the two dimensional sensor data and/or tomographic data 147) so as to convert/transform the correlated data into a three dimensional coordinate system 150 of the test article 170. The non-destructive inspection apparatus 100 corrects the "n" dimension position data from the mobile device 130 to account for linear (e.g., distal) and rotational (e.g., gimbal) movement of the sensor 111 relative to the center point 103, which increases the accuracy of the "N" dimension position data relative to the sensor 111. The non-destructive inspection apparatus 100 stores the correlated data in the three dimensional coordinate system 150 for employment in a manufacturing environment to substantially eliminate or reduce logistics associated with defect tracking, defect marking, material review board sequencing, part holding (delaying part manufacture due to inspection/recordation of data), and material review board disposition. In accordance with aspects of the present disclosure, respective correlated data in a respective three dimensional coordinate system 150 may be stored for more than one test article 170 so that the correlated data is associated with the respective test article 170 throughout a lifecycle of the respective test article (e.g., for trending of damage assessment, repair tracking, and test article condition compared to an as-built condition of the test article).

Referring to FIG. 1A, the non-destructive inspection apparatus 100 includes a mobile device 130, an end effector 101 coupled to the mobile device, and a controller 140 coupled to the mobile device 130 and the end effector 101. Referring also to FIGS. 4, 5A, and 5B, the mobile device includes a mount 134 to which the end effector 101 is coupled in any suitable manner (such as with any suitable fasteners, clips, straps, etc.). The mount 134 includes a mounting surface 400 (FIG. 4) that defines a tool center point 401 (e.g., a reference datum of the mount from which mobile device 130 position data is established). The end effector 101 includes a base 410 (FIG. 4) that has or defines an end effector surface 102 that couples with the mounting surface 400 of the mobile device 130. The end effector surface 102 has a center point 103, which when coupled to the mount 134, is collocated with the tool center point 401. The end effector 101 includes a linear actuator 104 that is coupled to the base 410 and is configured to extend and/or retract in a direction normal (e.g., in the Z direction) to the end effector surface 102. A sensor unit 500 (FIG. 5) is coupled to the linear actuator 104 where the linear actuator 104 includes any suitable motors and bearings to effect extension and/or retraction of the sensor unit 500 in the Z direction.

The sensor unit 500 includes a first gimbal 119 disposed on the end of the linear actuator 104 so as to be extended and/or retracted by the linear actuator 104 relative to the inspection surface 171 of the test article 170. The first gimbal 119 includes a rotational coupling 502 that defines a first axis of rotation 122 that is substantially parallel with the end effector surface 102. The sensor unit 500 includes a second gimbal 123 pivotally connected to the rotational coupling 502 of the first gimbal 119. For example, the second gimbal 123 is pivotally coupled to the first gimbal 119, such as by a shoulder bolt 503 (or in any other suitable manner that provides a riding surface 504 on which the second gimbal 123 pivots). The second gimbal 123 defines a second axis of rotation 124 that is substantially perpendicular to the first axis of rotation 122. The sensor unit 500 includes a sensor 111 coupled to the second gimbal 123 so that the sensor 111 rotates with the second gimbal 123 about the second axis of rotation 124 and rotates relative to the first gimbal 119 about the first axis of rotation 122. The first gimbal 119 and the second gimbal 123 are configured so that the sensor 111 rotates about one or more of the first axis of rotation 122 and the second axis of rotation 124 depending on a contour 172 of the inspection surface 171 of the test article 170. The sensor 111 may be any suitable sensor for obtaining metrological data of the test article 170. For example, the sensor 111 may be a beam emitting sensor 112, an Eddy current sensor 114, or an ultrasonic sensor 113. The aspects of the present disclosure are described herein with respect to the ultrasonic sensor 113 for exemplary purposes only.

In one aspect, the first gimbal 119 includes a second gimbal guide rail 550. The second gimbal 123 includes a mating guide rail 555 that interfaces with the second gimbal guide rail 550 so as to limit rotational movement of the second gimbal 123 about second axis of rotation 124 to any suitable range of rotation such as about ±5° relative to the end effector surface 102. In other aspects, the suitable range of rotation may be more or less than about ±5° relative to the end effector surface 102. In still other aspects, the range of rotation of the second gimbal may not be limited. As an example, the mating guide rail 555 includes stop surfaces 556, 557 that couple with corresponding stop surfaces 558, 559 of the second gimbal guide rail 550 so as to limit the rotation of the second gimbal 123 about second axis of rotation 124.

The second gimbal 123 forms a housing 523 having a cavity 524 in which the sensor 111 is disposed. The sensor unit 500 of the end effector 101 may also include a replaceable wear surface plate or standoff 108 that is coupled to the second gimbal 123 so as to be disposed between the sensor 111 and the inspection surface 171 of the test article 170. The standoff 108 circumscribes the sensor 111 and has a riding surface 110 that couples with the test article 170 and holds the sensor 111 a predetermined distance 1000 (FIG. 10A) from the inspection surface 171 of the test article 170. The standoff 108 may be coupled to the second gimbal 123 in any suitable manner, such as with fasteners 526. The linear actuator 104 is configured to bias the standoff 108 against the inspection surface 171 of the test article 170 in any suitable manner. For example, the linear actuator 104 may be a pneumatic actuator where pneumatic pressure biases the standoff 108 against the inspection surface 171. In other aspects, the linear actuator 104 may include any suitable springs that bias the standoff 108 against the inspection surface 171.

The housing 523 may also include couplings 530 and passages 531 that direct ultrasonic coupling fluid 109 into a channel 532 of the standoff 108. The couplings may include an inlet and outlet so that the ultrasonic coupling fluid is circulated through the channel 532, while in other aspects some or all of the coupling fluid may leak from the channel between the riding surface 110 and the inspection surface 171. Walls 533 of the channel 532 circumscribe the sensor 111 and substantially retain the ultrasonic coupling fluid 109 within the channel 532 to facilitate transmission of, for example, ultrasonic waves from the sensor 111 to the test article 170. In other aspects, the channel 532 may retain any suitable coupling fluid to provide a transmission medium for any suitable waves/beams emitted from the sensor 111. In still other aspects, coupling fluid may not be provided (such as where the beam emitting sensor 112 is, e.g., an X-ray sensor).

Referring to FIGS. 1A and 6, the mobile device 130 controls movement of the end effector 101 relative to the test article 170. For example, the mobile device 130, under control of controller 140 (or any other suitable controller that may be in communication with controller 140), is configured to move the end effector 101 relative to the test article 170 in a pixel-to-pixel motion according to a coordinate system 150 of a test article three-dimensional solid model 148 and a known location 173 on the test article 170. The pixel-to-pixel motion is an incremental movement of the end effector 101 by a predetermined amounts XM, YM in a predetermined direction (either the X direction and/or the Y direction—so as to form a grid 600 of pixels 601) where the end effector 101 is stopped and the test article 170 is scanned before subsequent incremental movement XM, YM of the end effector 101. Some pixels 601 may overlap by any suitable distance XP, YP in one or more of the X direction and the Y direction depending on the amount of incremental movement XM, YM. The pixel 601 size may be defined by the size of the sensor 111 (such as by a size of a scanning array of the sensor 111).

Referring to FIGS. 1A, 1B, 2A and 2B, in one aspect the mobile device 130 is a robotic device 131 that includes a frame 132. The frame 132 includes a Cartesian drive system 133 that has the mount 134 configured to couple with the end effector surface 102 as described above. The Cartesian drive system 133 includes one or more X-axis rails 200. A Y-axis rail 210 is movably coupled to the X-axis rails 200 so as to be driven in any suitable manner along the X-axis rails 200. The mount 134 is movably coupled to the Y-axis rail 210 so as to be driven in any suitable manner along the Y-axis rail 210. The controller 140 (or any other suitable controller in communication with the controller 140) is configured to effect the movement of the end effector 101 through the Cartesian drive system 133. For example, the Cartesian drive system 133 includes any suitable motors that are driven under the control of, e.g., controller 140 to move the Y-axis rail 210 along the X-axis rails 200 and to move the mount 134 (and the end effector 101 coupled thereto) along Y-axis rail 210 to position the mount along the X and Y axes of the Cartesian drive system 133 relative to the test article 170. The Cartesian drive system 133 includes any suitable displacement sensors 250 positioned on the X-axis rails 200 and the Y-axis rail 210 for sending sensor signals to the controller 140, where the controller 140 determines, during the movement of the end effector 101 and based on the sensor signals, positional information of the center point 103 along at least the X and Y axes of the Cartesian drive system 133.

Referring to FIGS. 1A, 1D, and 3A, in one aspect the mobile device 130 is a robotic device 131 that includes a robotic arm 136. The robotic arm 136 has the mount 134 configured to couple with the end effector surface 102 as described above. The controller 140 (or any other suitable controller in communication with the controller 140) is configured to effect movement of the end effector 101 through the robotic arm 136. For example, the robotic arm 136 includes any suitable motors that drive arm links 301, 302 and the mount 134 of the robotic arm 136 along at least the X and Y directions. It is noted that in some aspects at least the mount 134 may also be driven in rotation relative to the arm links 301, 302 so that the end effector surface 102 remains substantially tangent to a portion of the inspection surface 171 being scanned; while in other aspects the mount 134 may not be driven in rotation relative to the arm links 301, 302. The robotic arm 136 includes any suitable displacement sensors 350 positioned on the robotic arm 136 (such as at joints 310, 311 of the robotic arm 136) for sending sensor signals to the controller 140, where the controller 140 determines, during the movement of the end effector 101 and based on the sensor signals, the positional information of the center point 103 along the X, Y, and Z axes of the robotic arm 136. It is noted that the X, Y, Z reference frame is used herein for explanatory purposes only and it should be understood that the reference frame may be any suitable reference frame (which may depend on a particular application in which the aspects of the present disclosure are employed).

Referring to FIGS. 1A and 1C, in one aspect, the mobile device 130 includes a passive (i.e., unmotorized) articulated arm 135. The passive articulated arm 135 includes the mount 134 configured to couple with the end effector surface. The passive articulated arm 135 may be substantially similar to robotic arm 136; however in this aspect, the passive articulated arm 135 includes one or more handles 370 configured so that an operator may manually move the end effector 101 with the passive articulated arm 135 in at least the X, Y, and Z directions. The passive articulated arm may include balanced arm links 333, 334 so that the passive articulated arm 135 maintains position when the operator releases the one or more handles 370 and so that the passive articulated arm may be manipulated by the operator with minimal operator effort. It is noted that in some aspects at least the mount 134 may also be driven in rotation relative to the arm links 333, 334 so that the end effector surface 102 remains substantially tangent to a portion of the inspection surface 171 being scanned; while in other aspects the mount 134 may not be driven in rotation relative to the arm links 333, 334. The passive articulated arm 135 includes any suitable displacement sensors 350 positioned on the passive articulated arm 135 (such as at joints 310, 311 of the passive articulated arm 135) for sending sensor signals to the controller 140, where the controller 140 determines, during the movement of the end effector 101 and based on the sensor signals, the positional information of the center point 103 along the X, Y, and Z axes of the passive articulated arm 135.

Referring to FIGS. 1A, 4, 9, 10A, and 10B, the first gimbal 119, the second gimbal 123, and the linear actuator 104 provide the end effector 101 with articulation so that a position of the center point 103 and the end effector surface 102 may vary (e.g., the end effector surface 102 need not be tangent to the inspection surface 171 at all times). An amount of articulation of the end effector may vary from one test article 170 to another test article however, the articulation substantially maintains the standoff 108 in contact with the inspection surface 171 and substantially maintains a sensor beam 117 emitted by the sensor 111 substantially normal to the inspection surface 171. For exemplary purposes, where the sensor 111 comprises an ultrasonic (phased array) sensor 113, the sensor 111 includes an ultrasonic sensor array 115. The ultrasonic sensor array 115 includes a plurality of ultrasonic elements 116 configured to emit the sensor beam 117. The ultrasonic sensor 113 may be constructed from a single piece of ceramic crystal that is machined to create individual crystal elements (e.g., ultrasonic elements 116) along a single substrate. The ultrasonic sensor 113 may have, for exemplary purposes only, 24 ultrasonic elements 116 that can be actuated e.g., under control of controller 140) to create ultrasonic beam patterns from multiple ultrasonic elements 116 at a time. For example, the ceramic crystal having 24 ultrasonic elements 116 may be employed in such a way so as to generate 23 ultrasonic beams (e.g., sensor beams 117) comprised of four ultrasonic elements 116 per ultrasonic beam 117. The first ultrasonic beam 117 (or channel) would be generated by/comprise the first four ultrasonic elements and is illustrated in FIGS. 9, 10A, 10B for exemplary purposes. It can be appreciated that the spatial location of the sensor beam 117 (for each channel of the ultrasonic sensor array 115) depends on the displacement of the sensor 111 along one or more of the Z, A, B, C axes relative to the center point 103.

As described above, the controller 140 is configured to receive the sensor data 146 for the location on the inspection surface 171 of the test article 170 along with location information 152 that includes the displacement of the sensor 111 relative to the center point 103 of the end effector surface 102. For example, the controller 140 is configured to receive positional information of the center point 103 in one or more of the X, Y, Z, A, B, C axes from the displacement sensors 250, 350 (see FIGS. 2A, 3A, 3B) of the mobile device 130 for determining the spatial location of the center point 103; however, the positional information from the displacement sensors 250, 350 of the mobile device 130 may not be representative of the position of the ultrasonic sensor array 115, such as when the ultrasonic sensor array 115 is capturing data from the contoured inspection surface 171, such as any suitable surface of an aircraft 190 (such as an aircraft fuselage 191, wing 192, etc.). To accurately determine the position of the ultrasonic sensor array 115, the end effector 101 includes displacement sensors 106, 120, 125 on the linear actuator 104, the first gimbal 119, and the second gimbal 123. The displacement sensors 106, 120, 125 are coupled to the controller 140 to effect, substantially simultaneously with the movement of the end effector 101 by the mobile device 130, a determination of an amount of linear actuator extension (also referred to Z offset) 1001 (FIG. 10A), an amount of rotation θ (FIG. 10A) of the sensor 111 about the first axis of rotation 122, and an amount of rotation Φ (FIG. 10B) of the sensor 111 about the second axis of rotation 124.

The displacement sensor 106 may be a linear variable differential transformer (or other suitable sensor) that is placed on the linear actuator 104 in any suitable manner (such as between/adjacent a stationary rail 104R and a movable support 104M to which the sensor unit 500 is coupled so as to sense linear displacement of the movable support 104M—see FIG. 4) to determine the linear actuator extension 1001 relative to, for example, the end effector surface 102. The displacement sensor 120 may be a rotary variable differential transformer (or other suitable sensor) that is disposed adjacent the first axis of rotation 122 (or other suitable location) for sensing relative rotational displacement between, for example, the movable support 104M and the first gimbal 119. In one aspect, the relative rotational displacement about the first axis of rotation 122 may be measured from an origin orientation (e.g., the relative rotational displacement is substantially zero) of the sensor 111 about the first axis of rotation 122 where the sensor 111 is substantially parallel with the end effector surface 102. The displacement sensor 125 may be a rotary variable differential transformer (or other suitable sensor) that is disposed adjacent the second axis of rotation 124 (or other suitable location) for sensing relative rotational displacement between, for example, the first gimbal 119 and the second gimbal 123. In one aspect, the relative rotational displacement about the second axis of rotation 124 may be measured from an origin orientation (e.g., the relative rotational displacement is substantially zero) of the sensor 111 about the second axis of rotation 124 where the sensor 111 is substantially parallel with the first axis of rotation 122.

In another aspect, the displacement of the ultrasonic sensor array 115 of the sensor 111 may be determined by an optical spatial tracking system 160 that is coupled to the controller 140. In this aspect, the end effector 101 includes a plurality of optical tracking targets 107 disposed on the end effector 101 (such as on the first gimbal 119 and the second gimbal 123) to effect a determination of the amount of linear actuator extension 1001 and the amount of rotation θ, Φ, β of the sensor 111 about the first axis of rotation 122, the second axis of rotation 124, and/or the Z axis. It is noted that the amount of rotation β of the sensor 111 about the Z axis may also be determined from the displacement sensors 250, 250 (FIGS. 2A, 3A, 3B) of the mobile device 130.

The controller 140 is configured to determine, based on the amount of linear actuator extension 1001, the amount of rotation θ of the sensor 111 about the first axis of rotation 122 and the amount of rotation Φ of the sensor 111 about the second axis of rotation 124, a displacement of the sensor 142 relative to the center point 103 of the end effector surface 102 so as to determine location information 152 of the sensor 111, wherein sensor data 146 for a location 149 on the inspection surface 171 of the test article 170 is sensed and correlated with the determined location information 144 of the sensor 111. In one aspect, the controller 140 is configured to determine the displacement of the sensor 142 relative to the center point 103 of the end effector surface 102 based on the amount of linear actuator extension 1001, the amount of rotation θ, Φ of the sensor 111 about the first axis of rotation 122 and the second axis of rotation 124, and an amount of rotation β (FIG. 4) of the sensor 111 about an axis (e.g., the Z axis) substantially parallel with the linear actuator 104 extension.

The controller 140 may be programmed with (such as stored in memory 141 and executed by processor 154) any suitable rotational transformation 143 to determine displacement offset values $R_{AX}$, $R_{AY}$, $R_{AZ}$ of the sensor 111 in an articulated configuration relative to the center point 103 of the end effector 101. In one aspect, the controller 140 is configured to determine, with a combination of the linear displacement 153 and the rotational transformation 143, based on the amount of linear actuator extension 1001 and the amount of rotation θ, Φ of the sensor 111 about at least the first axis of rotation 122 and the second axis of rotation 124, a displacement of the sensor 142 in the articulated configuration relative to the center point 103 of the end effector 101. In one aspect, the sensor data 146 comprises tomographic data 147 of the test article 170 for at least the location 149 on the surface of the test article 170. Referring also to FIG. 11, the tomographic data 147 may also include sensor data for an interior location 149 of the test article 170 (such as between two exterior surfaces 1100, 1101 of the test article 170).

The displacement offset values $R_{AX}$, $R_{AY}$, $R_{AZ}$ and/or the linear displacement 153 of the sensor 111 may be added to the spatial location of the center point 103 as determined by the displacement sensors 250, 350 (FIGS. 2A, 3A, 3B) of the mobile device 130 to accurately determine the spatial position of the sensor 111. One suitable rotational transformation 143 for determining the displacement offset values $R_{AX}$, $R_{AY}$, $R_{AZ}$ is as follows:

$$R_{ARRAY} = \begin{bmatrix} R_X \\ R_Y \\ R_Z \end{bmatrix} = R_X(\theta)R_y(\phi)R_z(\beta) \begin{bmatrix} X \\ Y \\ Z \end{bmatrix} \text{ where,} \quad [1]$$

$$R_X(\theta) = \begin{bmatrix} 1 & 0 & 0 \\ 0 & \cos\theta & -\sin\theta \\ 0 & \sin\theta & \cos\theta \end{bmatrix} \quad [2]$$

-continued $$R_y(\emptyset) = \begin{bmatrix} \cos\emptyset & 0 & \sin\emptyset \\ 0 & 1 & 0 \\ -\sin\emptyset & 0 & \cos\emptyset \end{bmatrix} \text{ and} \quad [3]$$

$$R_z(\beta) = \begin{bmatrix} \cos\beta & -\sin\beta & 0 \\ \sin\beta & \cos\beta & 0 \\ 0 & 0 & 1 \end{bmatrix} \quad [4]$$

where X is the X offset 1050 (FIG. 10B) between the sensor beam 117 and the center point 103, Y is the Y offset 1051 (FIG. 10A) between the sensor beam 117 and the center point 103 (it is noted that the Y offset includes the offset of the sensor beam 117 at the inspection surface 171), Z is the Z offset 1001 (FIG. 10A) between the sensor beam 117 and the center point 103 (it is noted that this includes the linear actuator 104 displacement), θ is the angle of first gimbal 119 (FIG. 10A), Φ is the angle of the second gimbal (FIG. 10B), and β is the angle of rotation about the Z axis (FIG. 4) (which is about zero for a phased array skew angle of about 90°). In the example illustrated in the Figs. the X offset 1050 is substantially equal to zero for the sensor 111 rotation about β; however, if the ultrasonic beam 117 is projected (see projection 117P in FIGS. 10A and 10B) from the sensor 111 to the inspection surface 171, the sensor focal spot 117F (see FIGS. 10A and 10B) of the ultrasonic beam 117 will be displaced by a distance DY and/or distance DX on the inspection surface 171 relative to the center point 103 when the sensor is rotated about θ and/or Φ. The displacement distance DY and/or distance DX may be used for a three dimensional voxel type display (such as the voxel type display in FIG. 8) of the sensor 111 data relative to the rotation about θ and/or Φ. For example, when the incidence angle α (as described below) is included the distance DY and/or DX may be included (e.g., the rotational transformation may be modified or linearly translated based on the distance DY and/or DX) in the tomographic.

Referring to FIGS. 1 and 11, where the sensor data 146 includes tomographic data 147 the controller 140 is configured to modify the rotational transformation from equation [1] to account for a beam incidence angle α, relative to the inspection surface 171 of the test article 170, of the sensor beam 117 emitted by the sensor 111. For example, an additional correction may be employed to project the focal point 1110 of the sensor beam 117 within the test article 170. This correction can be thought of as a projection based on a beam incidence angle α and is an additional offset to the rotational transformation in equation [1] of the first gimbal 119 and the second gimbal 123 angle measurements obtained at least with the displacement sensors 120, 125. The projection is illustrated in FIG. 11 where Y1 and Z1 (representing the axes of the sensor beam 117 with steering) are projected onto Y0 and Z0 (representing the sensor beam without steering). In this example, Z0 is the focal depth and X0 is the center of the sensor beam 117 at the ultrasonic sensor array 115. Here, the projection of Z1 onto Z0 is substantially equal to the cos(α), the projection of Z1 onto Y0 is substantially equal to the −sin(α), the projection of Y1 onto Y0 is substantially equal to the cos(α), and the projection of Y1 onto Z0 is substantially equal to the sin(α). where $$R_{Focal\ Point\ Array} = \begin{bmatrix} Y1 \\ Z1 \\ X \end{bmatrix} = R(\propto) \begin{bmatrix} Y0 \\ Z0 \\ X \end{bmatrix} \text{ and} \quad [5]$$

$$R(\propto) = \begin{bmatrix} \cos\alpha & -\sin\alpha & 0 \\ \sin\alpha & \cos\alpha & 0 \\ 0 & 0 & 1 \end{bmatrix} \quad [6]$$

To account for complete homogenous transformation from the focal point 1110 to the center point 103 any suitable geometrical calculations (that are known in the art and need not be explained herein) may be employed by the controller to obtain the points anywhere along a linear array (such as the ultrasonic sensor array 115) riding on the inspection surface 171.

Referring to FIG. 1, the controller 140 is configured to correlate the sensor data 146 to a corresponding location 149 of the test article three-dimensional solid model 148 in any suitable manner. For example, the three-dimensional solid model 148 of the test article 148 has the coordinate system 150. The mobile device 130 includes datum features 137 having a known positional relationship with the sensor 111. The datum features 137 may be any suitable stops, pins, clips, etc. that couple with or are otherwise aligned with a corresponding datum feature(s) 175 (e.g., fastener(s), corners, window frames, etc.) of the test article 170 where the corresponding datum feature(s) 175 defines a known location 173 of the test article 170. The datum features 137 of the mobile device 130 are configured to effect positioning of the mobile device 130 on the inspection surface 171 of the test article 170 relative to the known location 173 of the test article 170 so that there is a known correlation between the coordinate system 150 of the test article three-dimensional solid model 148 (e.g., having substantially the same dimensional coordinates as the test article 170) and the XYZABC coordinate system (see, e.g., FIG. 4) of the mobile device 130. The controller 140 is configured to automatically overlay, in any suitable manner, the sensor data 146 (e.g., obtained by applying the offset corrections to the center point 103 using the about equations) on the test article three-dimensional solid model 148. For example, referring also to FIGS. 6-8, during inspection of the test article 170, the end effector 101 (and the sensor 111) is moved in a pixelated manner (see FIG. 6) by the mobile device 130 in any suitable spatial increments. A side view of one row of the pixelated movement of the sensor 111 is illustrated in FIG. 7 with respect to the contour 172 of the inspection surface 171. In this example, the sensor 111 produces C-scans 800 for each pixel location where the C-scan data is overlaid onto the test article three-dimensional solid model 148 in a voxel type format (as shown in FIG. 8) in the coordinate system 150 locations that correspond to the scanned pixelated locations of the test article 170. In one aspect, a respective test article three-dimensional solid model 148 and the correlated sensor 146 data are stored, in a memory 141 of the controller 140, for each test article 170 (where multiple test articles are inspected and their corresponding three-dimensional solid models are stored in the memory 141). The controller 140 is configured to store the sensor data 146, for one or more of the test articles 170, so as to form respective time series of sensor data 145 that define metrological trends 151 for respective locations 149 of the respective test article 170.

Referring to FIGS. 1 and 12, an exemplary method 1200 for inspecting a test article with the non-destructive inspection apparatus 100 includes positioning, with the mobile device 130 (such as, e.g., the robotic device 131 in FIGS. 1B and 1D or the passive articulated arm 135 in FIG. 1C), the end effector 101 relative to the test article 170 where the end effector 101 is coupled to the mobile device 130 so that the mobile device 130 controls movement of the end effector 101 (FIG. 12, Block 1201). Positioning the end effector 101 relative to the test article 170 includes coupling the end effector 101 with a test article 170 and holding the sensor 111 a predetermined distance (such as set by the standoff 108) from the inspection surface 171 of the test article 170 with the standoff 108 of the end effector 101 that circumscribes the sensor 111. The linear actuator 104 biases the standoff 108 against the inspection surface 171 of the test article 170. In one aspect, the ultrasonic coupling fluid 109 is substantially retained between the sensor 111 and the inspection surface 171 with the standoff 108. The end effector 101 is moved, with the mobile device 130, relative to the test article 170 in a pixel-to-pixel motion according to a coordinate system 150 of the test article three-dimensional solid model 148 and a known location 173 on the test article 170.

The method 1200 includes determining, with the mobile device 130 during the movement of the end effector 101, positional information for the center point 103 of the end effector surface 102 (FIG. 12, Block 1210). The controller 140, coupled to the mobile device 130 and the end effector 101, determines based on an amount of linear actuator extension 1001 (FIG. 10A) and an amount of rotation of the sensor 111 about the first axis of rotation 122 and the second axis of rotation 124 as a result of physical end effector interaction with the test article 170, a displacement of the sensor 142 relative to the center point 103 of the end effector surface 102 so as to determine location information 152 of the sensor 111, wherein sensor data 146 for a location on the inspection surface 171 of the test article 170 is sensed and correlated with the determined location information 144 of the sensor 111 (FIG. 12, Block 1220). In one aspect, the controller 140 determines, substantially simultaneously with moving of the end effector, the amount of linear actuator extension 1001 and the amount of rotation of the sensor 111 about the first axis of rotation 122 and the second axis of rotation 124, wherein the end effector 101 includes displacement sensors 106, 120, 125 on the linear actuator 104, the first gimbal 119, and the second gimbal 123, the displacement sensors 106, 120, 125 being coupled to the controller 140. The displacement of the sensor 111 relative to the center point 103 of the end effector surface 102 is based on the amount of linear actuator extension 1001, the amount of rotation of the sensor 111 about the first axis of rotation 122 and the second axis of rotation 124, and an amount of rotation of the sensor about an axis (e.g., the Z axis) substantially parallel with the linear actuator 104 extension. In one aspect, the amount of linear actuator extension 1001 and the amount of rotation of the sensor 111 about the first axis of rotation 122 and the second axis of rotation 124 is determined with an optical spatial tracking system 160 (used in conjunction with or in lieu of one or more of the displacement sensors 106, 120, 125) coupled to the controller 140, wherein the end effector 101 includes the plurality of optical tracking targets 107 disposed on the end effector 101.

In one aspect, the sensor data 146 is sensed with the ultrasonic sensor array 115 having the plurality of ultrasonic elements 116. In accordance with aspects of the present disclosure, the controller 140 receives the sensor data 146 for the location on the inspection surface 171 of the test article 170 along with location information 152 that includes the displacement of the sensor 111 relative to the center point 103 of the end effector surface 102.

In one aspect, determining the location information 152 includes determining, with the controller 140 performing a combination of a linear displacement and a rotational transformation based on the amount of linear actuator extension 1001 and the amount of rotation of the sensor 111 about the first axis of rotation 122 and the second axis of rotation 124, a displacement of the sensor 142 in an articulated configuration relative to the center point 103 of the end effector 101. In one aspect, the controller 140 modifies the rotational transformation to account for a beam incidence angle 118, relative to the inspection surface 171 of the test article 170, of the sensor beam 117 emitted by the sensor 111. The controller 140 correlates the sensor data 146 to a corresponding location 149 of the test article three-dimensional solid model 148, where the controller 140 stores a respective test article three-dimensional solid model 148 and the correlated sensor data 146 in a memory 141 of the controller 140, for each test article 170. The controller 140 generates a time series of sensor data 145 from the sensor data 146 that defines metrological trends 151 for the respective locations 149 of the test article 170 (such as on the test article three-dimensional solid model 148). In one aspect, the sensor data 146 includes tomographic data 147, as described above, where the tomographic data 147 is correlated to the respective locations 149 of the test article, and in one aspect, the tomographic data 147 at least in part defines the metrological trends 151 for the respective locations 149 of the test article 170.

Referring to FIGS. 1 and 13, another exemplary synchronous method 1300 (where the sensor 111 is activated in between pixelated movements of the sensor) for inspecting the test article 170 includes obtaining with the controller 140 the center point 103 position of the end effector 101 (FIG. 13, Block 1301) such as with the displacement sensors 250, 350 of the mobile device 130. The controller 140 obtains the rotational position of each of the first gimbal 119 and the second gimbal 123 (FIG. 13, Block 1305) such as from the displacement sensors 120, 125. The controller 140 also obtains the position/extension of the linear actuator 104 (FIG. 13, Block 1310) such as from the displacement sensor 106. The displacement of the sensor 142 is determined by the controller 140 in the manner described herein (FIG. 13, Block 1315). The controller 140 applies the linear and rotational transformations (as described herein) to offset the center point 103 (FIG. 13, Block 1320) to reflect the articulated position of the sensor 111 on the end effector 101. The controller 140 actuates the sensor 111 and obtains sensor data 146 (FIG. 13, Block 1325) for the pixel location at which the sensor 111 is located. The controller 140 correlates the sensor data 146 (employing the offsets to the center point 103) to the test article three-dimensional solid model 148 (FIG. 13, Block 1330). The controller 140 causes a display (on any suitable user interface 180 (FIG. 1) of the correlated sensor data in the voxel type format, an example of which is illustrated in FIG. 8 (FIG. 13, Block 1335). The mobile device 130 moves the sensor 111 one pixel (either in one or more of the X direction and Y direction) (FIG. 13, Block 1340) and Blocks 1301-1335 may be repeated for the new pixel location.

Referring to FIGS. 1 and 14 exemplary asynchronous method 1400 (where the sensor 111 is activated by an internal clock regardless of the pixelated movements of the sensor 111) for inspecting the test article 170 includes configuring the sensor to activate according to an internal clock signal, such as an internal clock signal from the controller 140 or other suitable source (FIG. 14, Block 1401). The controller 140 asynchronously obtains the sensor data 146 from the sensor 111 (FIG. 14, Block 1405). The controller 140 obtains the center point 103 position of the end effector 101 (FIG. 14, Block 1410) such as with the displacement sensors 250, 350 of the mobile device 130. The controller 140 obtains the rotational position of each of the first gimbal 119 and the second gimbal 123 (FIG. 14, Block 1415) such as from the displacement sensors 120, 125. The controller 140 also obtains the position/extension of the linear actuator 104 (FIG. 14, Block 1420) such as from the displacement sensor 106. The displacement of the sensor 142 is determined by the controller 140 in the manner described herein (FIG. 14, Block 1425). The controller 140 applies the linear and rotational transformations (as described herein) to offset the center point 103 (FIG. 14, Block 1430) to reflect the articulated position of the sensor 111 on the end effector 101. The controller 140 obtains the latest (e.g., the sensor data from the last sensor 111 activation, according to the clocked sensor activation, after moving the sensor 111 to a current pixel location but before moving the sensor to a next pixel location) (FIG. 14, Block 1435). The controller 140 correlates the sensor data 146 (employing the offsets to the center point 103) to the test article three-dimensional solid model 148 (FIG. 14, Block 1440). The controller 140 causes a display (on any suitable user interface 180 (FIG. 1) of the correlated sensor data in the voxel type format, an example of which is illustrated in FIG. 8 (FIG. 14, Block 1445). The mobile device 130 moves the sensor 111 one pixel (either in one or more of the X direction and Y direction) (FIG. 14, Block 1450) and Blocks 1410-1445 may be repeated for the new pixel location.

Referring to FIGS. 1 and 15 exemplary lookup table method 1500 (where the center point 103 offset are obtained from a predetermined lookup table 181) for inspecting the test article 170 includes limiting movement of the first gimbal 119 and the second gimbal 123 (FIG. 15, Block 1501) such as with any suitable limit stops 182 disposed on the linear actuator 104 (to physically limit rotation of the first gimbal 119) and any suitable limit stops 183 disposed on the first gimbal 119 (to physically limit rotation of the second gimbal 123). In one aspect, the rotation of the first gimbal 119 and the rotation of the second gimbal 123 are limited to a smallest curve on the contour 172 of the inspection surface 171. In one aspect, the rotation of the first gimbal 119 and the second gimbal 123 is limited to about ±5°; while in other aspects, the rotational limitations may be more or less than about ±5°. The lookup table 181 is created and stored in the memory 141 (FIG. 15, Block 1505) where the lookup table includes center point 103 offset values 184 corresponding to predetermine angular intervals of the first gimbal 119 and the second gimbal 123. In one aspect, the predetermined interval may be about every 1° of rotation of each of the first gimbal 119 and the second gimbal 123, where in other aspects the angular interval may be more or less than about every 1°. The controller 140 obtains the center point 103 position of the end effector 101 (FIG. 15, Block 1510) such as with the displacement sensors 250, 350 of the mobile device 130. The controller 140 obtains the rotational position of each of the first gimbal 119 and the second gimbal 123 (FIG. 15, Block 1515) such as from the displacement sensors 120, 125. The controller 140 also obtains the position/extension of the linear actuator 104 (FIG. 15, Block 1520) such as from the displacement sensor 106. The displacement of the sensor 142 is determined by the controller 140 in the manner described herein (FIG. 15, Block 1525). The controller 140 applies the predetermined center point 103 offset values 184 from the lookup table 181 to the center point 103 (FIG. 15, Block 1530) to reflect the articulated position of the sensor 111 on the end effector 101. The controller 140 obtains the sensor data 146 (either synchronously or asynchronously as described above) (FIG. 15, Block 1535). The controller 140 correlates the sensor data 146 (employing the offset values 184 to the center point 103) to the test article three-dimensional solid model 148 (FIG. 15, Block 1540). The controller 140 causes a display (on any suitable user interface 180 (FIG. 1) of the correlated sensor data in the voxel type format, an example of which is illustrated in FIG. 8 (FIG. 15, Block 1545). The mobile device 130 moves the sensor 111 one pixel (either in one or more of the X direction and Y direction) (FIG. 15, Block 1550) and Blocks 1510-1545 may be repeated for the new pixel location.

Referring to FIGS. 1 and 16 exemplary optical data capture method 1600 (where the center point 103 offset is determined using the optical spatial tracking system 160) for inspecting the test article 170 includes obtaining, with the controller 140, the sensor 111 position (e.g., linear extension of the actuator 104 and rotational angles of the first gimbal 119 and the second gimbal 123) with the optical spatial tracking system 160 (FIG. 16, Block 1601) as described herein. In this example, linear and rotational transformations may not be needed as the position of the sensor is directly determined by the optical spatial tracking system 160. The sensor data 146 is obtained by the controller 140 asynchronously or synchronously (FIG. 16, Block 1605) as described herein. The controller 140 correlates the sensor data 146 (employing the directly determined center point 103 location) to the test article three-dimensional solid model 148 (FIG. 16, Block 1610). The controller 140 causes a display (on any suitable user interface 180 (FIG. 1) of the correlated sensor data in the voxel type format, an example of which is illustrated in FIG. 8 (FIG. 16, Block 1615). The mobile device 130 moves the sensor 111 one pixel (either in one or more of the X direction and Y direction) (FIG. 16, Block 1620) and Blocks 1601-1615 may be repeated for the new pixel location.

The following are provided in accordance with the aspects of the present disclosure:

A1. A non-destructive inspection apparatus comprising:
an end effector comprising
a linear actuator configured to extend normal to an end effector surface,
a first gimbal disposed on an end of the linear actuator so as to be extended by the linear actuator, the first gimbal comprising a rotational coupling that defines a first axis of rotation that is substantially parallel with the end effector surface,
a second gimbal pivotally connected to the rotational coupling of the first gimbal, the second gimbal defines a second axis of rotation that is substantially perpendicular to the first axis of rotation, and
a sensor coupled to the second gimbal so that the sensor rotates with the second gimbal about the second axis of rotation and rotates relative to the first gimbal about the first axis of rotation;
a robotic device, the end effector being coupled to the robotic device so that the robotic device controls movement of the end effector, the robotic device being configured to determine, during the movement of the end effector, positional information for a center point of the end effector surface; and
a controller coupled to the robotic device and the end effector, the controller being configured to determine, based on an amount of linear actuator extension and an amount of rotation of the sensor about the first axis of rotation and the second axis of rotation, a displacement of the sensor relative to the center point of the end effector surface so as to determine location information of the sensor, wherein sensor data for a location on an inspection surface of a test article is sensed and correlated with the determined location information of the sensor.

A2. The non-destructive inspection apparatus of paragraph A1, wherein the sensor comprises an ultrasonic sensor array having a plurality of ultrasonic elements.

A3. The non-destructive inspection apparatus of paragraph A1, wherein the controller is configured to receive the sensor data for the location on the inspection surface of the test article along with location information that includes the displacement of the sensor relative to the center point of the end effector surface.

A4. The non-destructive inspection apparatus of paragraph A1, wherein the controller is configured to determine, with a combination of a linear displacement and a rotational transformation based on the amount of linear actuator extension and the amount of rotation of the sensor about the first axis of rotation and the second axis of rotation, a displacement of the sensor in an articulated configuration relative to the center point of the end effector.

A5. The non-destructive inspection apparatus of paragraph A4, wherein the controller is configured to:
determine a displacement distance between a focal point of a sensor beam emitted by the sensor, as projected on the inspection surface, and the center point of the end effector; and
modify the rotational transformation to account for the displacement distance.

A6. The non-destructive inspection apparatus of paragraph A4, wherein the controller is configured to modify the rotational transformation to account for a beam incidence angle, relative to the inspection surface of the test article, of a sensor beam emitted by the sensor.

A7. The non-destructive inspection apparatus of paragraph A1, wherein the end effector further comprises a standoff that circumscribes the sensor, the standoff having a riding surface that couples with a test article and holds the sensor a predetermined distance from the inspection surface of the test article.

A8. The non-destructive inspection apparatus of paragraph A7, wherein the standoff is configured to substantially retain an ultrasonic coupling fluid.

A9. The non-destructive inspection apparatus of paragraph A7, wherein the linear actuator is configured to bias the standoff against the inspection surface of the test article.

A10. The non-destructive inspection apparatus of paragraph A7, wherein the first gimbal and the second gimbal are configured so that the sensor rotates about one or more of the first axis of rotation and the second axis of rotation depending on a contour of the inspection surface of the test article.

A11. The non-destructive inspection apparatus of paragraph A1, wherein:
the robotic device is configured to move the end effector relative to the test article in a pixel-to-pixel motion according to a coordinate system of a test article three-dimensional solid model and a known location on the test article; and
the controller is configured to correlate the sensor data to a corresponding location of the test article three-dimensional solid model.

A12. The non-destructive inspection apparatus of paragraph A11, wherein a respective test article three-dimensional solid model and the correlated sensor data are stored, in a memory of the controller, for each test article, where the controller is configured to generate a time series of sensor data from the sensor data that defines metrological trends for respective locations of the test article.

A13. The non-destructive inspection apparatus of paragraph A1, wherein the end effector includes displacement sensors on the linear actuator, the first gimbal, and the second gimbal, the displacement sensors being coupled to the controller to effect, substantially simultaneously with the movement of the end effector, a determination of the amount of linear actuator extension and the amount of rotation of the sensor about the first axis of rotation and the second axis of rotation.

A14. The non-destructive inspection apparatus of paragraph A1, further comprising an optical spatial tracking system coupled to the controller, wherein the end effector includes a plurality of optical tracking targets disposed on the end effector to effect a determination of the amount of linear actuator extension and the amount of rotation of the sensor about the first axis of rotation and the second axis of rotation.

A15. The non-destructive inspection apparatus of paragraph A1, wherein the sensor is a beam emitting sensor.

A16. The non-destructive inspection apparatus of paragraph A15, wherein the beam emitting sensor is an ultrasonic sensor.

A17. The non-destructive inspection apparatus of paragraph A1, wherein the sensor is an Eddy current sensor.

A18. The non-destructive inspection apparatus of paragraph A1, wherein the controller is configured to determine the displacement of the sensor relative to the center point of the end effector surface based on the amount of linear actuator extension, the amount of rotation of the sensor about the first axis of rotation and the second axis of rotation, and an amount of rotation of the sensor about an axis substantially parallel with the linear actuator extension.

A19. The non-destructive inspection apparatus of paragraph A18, wherein the sensor data comprises tomographic data of the test article for at least the location on the inspection surface of the test article, where the controller is configured to determine the tomographic data (147) based on a modification of a rotational transformation (143) of sensor data (146) and a beam incidence angle ($\alpha$) of a sensor beam (117) emitted by the sensor (111).

B1. A non-destructive inspection apparatus comprising:
an end effector comprising
a linear actuator configured to extend normal to an end effector surface,
a first gimbal disposed on an end of the linear actuator so as to be extended by the linear actuator, the first gimbal comprising a rotational coupling that defines a first axis of rotation that is substantially parallel with the end effector surface,
a second gimbal pivotally connected to the rotational coupling of the first gimbal, the second gimbal defines a second axis of rotation that is substantially perpendicular to the first axis of rotation, and
a sensor coupled to the second gimbal so that the sensor rotates with the second gimbal about the second axis of rotation and rotates relative to the first gimbal about the first axis of rotation;
a mobile device, the end effector being coupled to the mobile device so that the mobile device controls movement of the end effector, the mobile device being configured to determine, during the movement of the end effector, positional information for a center point of the end effector surface; and a controller coupled to the mobile device and the end effector, the controller being configured to determine, based on an amount of linear actuator extension and an amount of rotation of the sensor about the first axis of rotation and the second axis of rotation, a displacement of the sensor relative to the center point of the end effector surface so as to determine location information of the sensor, wherein sensor data for a location on an inspection surface of a test article is sensed and correlated with the determined location information of the sensor.

B2. The non-destructive inspection apparatus of paragraph B1, wherein the mobile device comprises frame including a Cartesian drive system, the Cartesian drive system having a mount configured to couple with the end effector surface.

B3. The non-destructive inspection apparatus of paragraph B2, wherein the controller is configured to effect the movement of the end effector through the Cartesian drive system.

B4. The non-destructive inspection apparatus of paragraph B1, wherein the mobile device comprises a passive (i.e., unmotorized) articulated arm having a mount configured to couple with the end effector surface.

B5. The non-destructive inspection apparatus of paragraph B1, wherein the mobile device comprises a robotic arm having a mount configured to couple with the end effector surface.

B6. The non-destructive inspection apparatus of paragraph B1, wherein the mobile device comprises datum features having a known positional relationship with the sensor, the datum features being configured to effect positioning of the mobile device on the inspection surface of the test article relative to a known position of the test article.

B7. The non-destructive inspection apparatus of paragraph B1, wherein the sensor comprises an ultrasonic sensor array having a plurality of ultrasonic elements.

B8. The non-destructive inspection apparatus of paragraph B1, wherein the controller is configured to receive the sensor data for the location on the inspection surface of the test article along with location information that includes the displacement of the sensor relative to the center point of the end effector surface.

B9. The non-destructive inspection apparatus of paragraph B1, wherein the controller is configured to determine, with a combination of a linear displacement and a rotational transformation based on the amount of linear actuator extension and the amount of rotation of the sensor about the first axis of rotation and the second axis of rotation, a displacement of the sensor in an articulated configuration relative to the center point of the end effector.

B10. The non-destructive inspection apparatus of paragraph B9, wherein the controller is configured to:
determine a displacement distance between a focal point of a sensor beam emitted by the sensor, as projected on the inspection surface, and the center point of the end effector; and
modify the rotational transformation to account for the displacement distance.

B11. The non-destructive inspection apparatus of paragraph B9, wherein the controller is configured to modify the rotational transformation to account for a beam incidence angle, relative to the inspection surface of the test article, of a sensor beam emitted by the sensor.

B12. The non-destructive inspection apparatus of paragraph B1, wherein the end effector further comprises a standoff that circumscribes the sensor, the standoff having a riding surface that couples with a test article and holds the sensor a predetermined distance from the inspection surface of the test article.

B13. The non-destructive inspection apparatus of paragraph B12, wherein the standoff is configured to substantially retain an ultrasonic coupling fluid.

B14. The non-destructive inspection apparatus of paragraph B12, wherein the linear actuator is configured to bias the standoff against the inspection surface of the test article.

B15. The non-destructive inspection apparatus of paragraph B12, wherein the first gimbal and the second gimbal are configured so that the sensor rotates about one or more of the first axis of rotation and the second axis of rotation depending on a contour of the inspection surface of the test article.

B16. The non-destructive inspection apparatus of paragraph B1, wherein:
the mobile device is configured to move the end effector relative to the test article in a pixel-to-pixel motion according to a coordinate system of a test article three-dimensional solid model and a known location on the test article; and
the controller is configured to correlate the sensor data to a corresponding location of the test article three-dimensional solid model.

B17. The non-destructive inspection apparatus of paragraph B16, wherein a respective test article three-dimensional solid model and the correlated sensor data are stored, in a memory of the controller, for each test article, where the controller is configured to store the sensor data so as to form a time series of sensor data that define metrological trends for respective locations of the test article.

B18. The non-destructive inspection apparatus of paragraph B1, wherein the end effector includes displacement sensors on the linear actuator, the first gimbal, and the second gimbal, the displacement sensors being coupled to the controller to effect, substantially simultaneously with the movement of the end effector, a determination of the amount of linear actuator extension and the amount of rotation of the sensor about the first axis of rotation and the second axis of rotation.

B19. The non-destructive inspection apparatus of paragraph B1, further comprising an optical spatial tracking system coupled to the controller, wherein the end effector includes a plurality of optical tracking targets disposed on the end effector to effect a determination of the amount of linear actuator extension and the amount of rotation of the sensor about the first axis of rotation and the second axis of rotation.

B20. The non-destructive inspection apparatus of paragraph B1, wherein the sensor is a beam emitting sensor.

B21. The non-destructive inspection apparatus of paragraph B20, wherein the beam emitting sensor is an ultrasonic sensor.

B22. The non-destructive inspection apparatus of paragraph B1, wherein the sensor is an Eddy current sensor.

B23. The non-destructive inspection apparatus of paragraph B1, wherein the controller is configured to determine the displacement of the sensor relative to the center point of the end effector surface based on the amount of linear actuator extension, the amount of rotation of the sensor about the first axis of rotation and the second axis of rotation, and an amount of rotation of the sensor about an axis substantially parallel with the linear actuator extension.

B24. The non-destructive inspection apparatus of paragraph B23, wherein the sensor data comprises tomographic data of the test article for at least the location on the inspection surface of the test article, where the controller is configured to determine the tomographic data (147) based on a modification of a rotational transformation (143) of sensor data (146) and a beam incidence angle (α) of a sensor beam (117) emitted by the sensor (111).

C1. A method for inspecting a test article with a non-destructive inspection apparatus, the method comprising:
positioning, with a robotic device, an end effector relative to the test article where the end effector is coupled to the robotic device so that the robotic device controls movement of the end effector and the end effector comprises
a linear actuator configured to extend normal to an end effector surface,
a first gimbal disposed on an end of the linear actuator so as to be extended by the linear actuator, the first gimbal comprising a rotational coupling that defines a first axis of rotation that is substantially parallel with the end effector surface,
a second gimbal pivotally connected to the rotational coupling of the first gimbal, the second gimbal defines a second axis of rotation that is substantially perpendicular to the first axis of rotation, and
a sensor coupled to the second gimbal so that the sensor rotates with the second gimbal about the second axis of rotation and rotates relative to the first gimbal about the first axis of rotation;
determining, with the robotic device during the movement of the end effector, positional information for a center point of the end effector surface; and
determining, with a controller coupled to the robotic device and the end effector, based on an amount of linear actuator extension and an amount of rotation of the sensor about the first axis of rotation and the second axis of rotation as a result of physical end effector interaction with the test article, a displacement of the sensor relative to the center point of the end effector surface so as to determine location information of the sensor, wherein sensor data for a location on an inspection surface of a test article is sensed and correlated with the determined location information of the sensor.

C2. The method of paragraph C1, further comprising sensing the sensor data with an ultrasonic sensor array having a plurality of ultrasonic elements.

C3. The method of paragraph C1, further comprising, receiving, with the controller, the sensor data for the location on the inspection surface of the test article along with location information that includes the displacement of the sensor relative to the center point of the end effector surface.

C4. The method of paragraph C1, further comprising determining, with the controller performing a combination of a linear displacement and a rotational transformation based on the amount of linear actuator extension and the amount of rotation of the sensor about the first axis of rotation and the second axis of rotation, a displacement of the sensor in an articulated configuration relative to the center point of the end effector.

C5. The method of paragraph C4, further comprising modifying, with the controller, the rotational transformation to account for a beam incidence angle, relative to the inspection surface of the test article, of a sensor beam emitted by the sensor.

C6. The method of paragraph C1, further comprising coupling the end effector with a test article and holding the sensor a predetermined distance from the inspection surface of the test article with a standoff of the end effector that circumscribes the sensor.

C7. The method of paragraph C6, further comprising substantially retain an ultrasonic coupling fluid between the sensor and the inspection surface with the standoff.

C8. The method of paragraph C6, further comprising biasing, with the linear actuator, the standoff against the inspection surface of the test article.

C9. The method of paragraph C6, wherein the first gimbal and the second gimbal are configured so that the sensor rotates about one or more of the first axis of rotation and the second axis of rotation depending on a contour of the inspection surface of the test article.

C10. The method of paragraph C1, further comprising:
moving, with the robotic device, the end effector relative to the test article in a pixel-to-pixel motion according to a coordinate system of a test article three-dimensional solid model and a known location on the test article; and
correlating, with the controller, the sensor data to a corresponding location of the test article three-dimensional solid model.

C11. The method of paragraph C10, further comprising:
storing, with the controller, a respective test article three-dimensional solid model and the correlated sensor data, in a memory of the controller, for each test article; and
generating, with the controller, a time series of sensor data from the sensor data that defines metrological trends for respective locations of the test article.

C12. The method of paragraph C1, further comprising substantially simultaneously moving the end effector and determining, with the controller, the amount of linear actuator extension and the amount of rotation of the sensor about the first axis of rotation and the second axis of rotation, wherein the end effector includes displacement sensors on the linear actuator, the first gimbal, and the second gimbal, the displacement sensors being coupled to the controller.

C13. The method of paragraph C1, further comprising determining the amount of linear actuator extension and the amount of rotation of the sensor about the first axis of rotation and the second axis of rotation with an optical spatial tracking system coupled to the controller, wherein the end effector includes a plurality of optical tracking targets disposed on the end effector.

C14. The method of paragraph C1, further comprising determining, with the controller, the displacement of the sensor relative to the center point of the end effector surface based on the amount of linear actuator extension, the amount of rotation of the sensor about the first axis of rotation and the second axis of rotation, and an amount of rotation of the sensor about an axis substantially parallel with the linear actuator extension.

C15. The method of paragraph C14, wherein the sensor data comprises tomographic data of the test article for at least the location on the inspection surface of the test article.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 12-16, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 12-16 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A non-destructive inspection apparatus comprising:
   an end effector comprising
   a linear actuator configured to extend normal to an end effector surface,
   a first gimbal disposed on an end of the linear actuator so as to be extended by the linear actuator, the first gimbal comprising a rotational coupling that defines a first axis of rotation that is substantially parallel with the end effector surface,
   a second gimbal pivotally connected to the rotational coupling of the first gimbal, the second gimbal defines a second axis of rotation that is substantially perpendicular to the first axis of rotation, and
   a sensor coupled to the second gimbal so that the sensor rotates with the second gimbal about the second axis of rotation and rotates relative to the first gimbal about the first axis of rotation, wherein the linear actuator is configured to bias the sensor against an inspection surface of a test article;
   a mobile device, the end effector being separate and distinct from the mobile device and configured to couple with the mobile device so that the mobile device controls movement of the end effector, the mobile device being configured to determine, during the movement of the end effector, positional information for a center point of the end effector surface; and a controller coupled to the mobile device and the end effector, the controller being configured to determine, based on an amount of linear actuator extension and an amount of rotation of the sensor about the first axis of rotation and the second axis of rotation, a displacement of the sensor relative to the center point of the end effector surface so as to determine location information of the sensor, wherein sensor data for a location on the inspection surface of the test article is sensed and correlated with the determined location information of the sensor.

2. The non-destructive inspection apparatus of claim 1, wherein the mobile device comprises frame including a Cartesian drive system, the Cartesian drive system having a mount configured to couple with the end effector surface.

3. The non-destructive inspection apparatus of claim 2, wherein the controller is configured to effect the movement of the end effector through the Cartesian drive system.

4. The non-destructive inspection apparatus of claim 1, wherein the mobile device comprises a passive articulated arm having a mount configured to couple with the end effector surface.

5. The non-destructive inspection apparatus of claim 1, wherein the controller is configured to receive the sensor data for the location on the inspection surface of the test article along with location information that includes the displacement of the sensor relative to the center point of the end effector surface.

6. The non-destructive inspection apparatus of claim 1, wherein the controller is configured to determine, with a combination of a linear displacement and a rotational transformation based on the amount of linear actuator extension and the amount of rotation of the sensor about the first axis of rotation and the second axis of rotation, a displacement of the sensor in an articulated configuration relative to the center point of the end effector.

7. The non-destructive inspection apparatus of claim 6, wherein the controller is configured to modify the rotational transformation to account for a beam incidence angle, relative to the inspection surface of the test article, of a sensor beam emitted by the sensor.

8. The non-destructive inspection apparatus of claim 1, wherein the controller is configured to:
determine a displacement distance between a focal point of a sensor beam emitted by the sensor, as projected on the inspection surface, and the center point of the end effector; and
modify the rotational transformation to account for the displacement distance.

9. The non-destructive inspection apparatus of claim 1, wherein:
the mobile device is configured to move the end effector relative to the test article in a pixel-to-pixel motion according to a coordinate system of a test article three-dimensional solid model and a known location on the test article; and
the controller is configured to correlate the sensor data to a corresponding location of the test article three-dimensional solid model.

10. The non-destructive inspection apparatus of claim 9, wherein a respective test article three-dimensional solid model and the correlated sensor data are stored, in a memory of the controller, for each test article, where the controller is configured to store the sensor data so as to form a time series of sensor data that define metrological trends for respective locations of the test article.

11. The non-destructive inspection apparatus of claim 1, wherein the end effector includes displacement sensors on the linear actuator, the first gimbal, and the second gimbal, the displacement sensors being coupled to the controller to effect, substantially simultaneously with the movement of the end effector, a determination of the amount of linear actuator extension and the amount of rotation of the sensor about the first axis of rotation and the second axis of rotation.

12. A non-destructive inspection apparatus comprising:
an end effector comprising
a linear actuator configured to extend normal to an end effector surface,
a first gimbal disposed on an end of the linear actuator so as to be extended by the linear actuator, the first gimbal comprising a rotational coupling that defines a first axis of rotation that is substantially parallel with the end effector surface,
a second gimbal pivotally connected to the rotational coupling of the first gimbal, the second gimbal defines a second axis of rotation that is substantially perpendicular to the first axis of rotation, and
a sensor coupled to the second gimbal so that the sensor rotates with the second gimbal about the second axis of rotation and rotates relative to the first gimbal about the first axis of rotation, wherein the linear actuator is configured to bias the sensor against an inspection surface of a test article;
a robotic device, the end effector being separate and distinct from the robotic device and configured to couple with the robotic device so that the robotic device controls movement of the end effector, the robotic device being configured to determine, during the movement of the end effector, positional information for a center point of the end effector surface; and
a controller coupled to the robotic device and the end effector, the controller being configured to determine, based on an amount of linear actuator extension and an amount of rotation of the sensor about the first axis of rotation and the second axis of rotation, a displacement of the sensor relative to the center point of the end effector surface so as to determine location information of the sensor, wherein sensor data for a location on the inspection surface of the test article is sensed and correlated with the determined location information of the sensor.

13. The non-destructive inspection apparatus of claim 12, wherein the end effector includes displacement sensors on the linear actuator, the first gimbal, and the second gimbal, the displacement sensors being coupled to the controller to effect, substantially simultaneously with the movement of the end effector, a determination of the amount of linear actuator extension and the amount of rotation of the sensor about the first axis of rotation and the second axis of rotation.

14. The non-destructive inspection apparatus of claim 12, wherein the controller is configured to determine the displacement of the sensor relative to the center point of the end effector surface based on the amount of linear actuator extension, the amount of rotation of the sensor about the first axis of rotation and the second axis of rotation, and an amount of rotation of the sensor about an axis substantially parallel with the linear actuator extension.

15. The non-destructive inspection apparatus of claim 14, wherein the sensor data comprises tomographic data of the test article for at least the location on the inspection surface of the test article, where the controller is configured to determine the tomographic data based on a modification of a rotational transformation of sensor data and a beam incidence angle ($\alpha$) of a sensor beam emitted by the sensor.

16. A method for inspecting a test article with a nondestructive inspection apparatus, the method comprising:

positioning, with a mobile device, an end effector relative to the test article where the end effector is separate and distinct from the mobile device and is coupled to the mobile device so that the mobile device controls movement of the end effector and the end effector comprises
- a linear actuator configured to extend normal to an end effector surface,
- a first gimbal disposed on an end of the linear actuator so as to be extended by the linear actuator, the first gimbal comprising a rotational coupling that defines a first axis of rotation that is substantially parallel with the end effector surface,
- a second gimbal pivotally connected to the rotational coupling of the first gimbal, the second gimbal defines a second axis of rotation that is substantially perpendicular to the first axis of rotation, and
- a sensor coupled to the second gimbal so that the sensor rotates with the second gimbal about the second axis of rotation and rotates relative to the first gimbal about the first axis of rotation, wherein the linear actuator biases the sensor against an inspection surface of a test article;

determining, with the mobile device during the movement of the end effector, positional information for a center point of the end effector surface; and determining, with a controller coupled to the mobile device and the end effector, based on an amount of linear actuator extension and an amount of rotation of the sensor about the first axis of rotation and the second axis of rotation as a result of physical end effector interaction with the test article, a displacement of the sensor relative to the center point of the end effector surface so as to determine location information of the sensor, wherein sensor data for a location on the inspection surface of the test article is sensed and correlated with the determined location information of the sensor.

17. The method of claim 16, further comprising, receiving, with the controller, the sensor data for the location on the inspection surface of the test article along with location information that includes the displacement of the sensor relative to the center point of the end effector surface.

18. The method of claim 16, further comprising determining, with the controller performing a combination of a linear displacement and a rotational transformation based on the amount of linear actuator extension and the amount of rotation of the sensor about the first axis of rotation and the second axis of rotation, a displacement of the sensor in an articulated configuration relative to the center point of the end effector.

19. The method of claim 16, further comprising:

moving, with the mobile device, the end effector relative to the test article in a pixel-to-pixel motion according to a coordinate system of a test article three-dimensional solid model and a known location on the test article; and correlating, with the controller, the sensor data to a corresponding location of the test article three-dimensional solid model.

20. The method of claim 19, further comprising:

storing, with the controller, a respective test article three-dimensional solid model and the correlated sensor data, in a memory of the controller, for each test article; and generating, with the controller, a time series of sensor data from the sensor data that defines metrological trends for respective locations of the test article.

* * * * *